(12) United States Patent
Surace

(10) Patent No.: US 11,900,823 B2
(45) Date of Patent: Feb. 13, 2024

(54) SYSTEMS AND METHODS FOR COMPUTING FLIGHT CONTROLS FOR VEHICLE LANDING

(71) Applicant: Honeywell International Inc., Charlotte, NC (US)

(72) Inventor: Lawrence Surace, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 94 days.

(21) Appl. No.: 17/661,788

(22) Filed: May 3, 2022

(65) Prior Publication Data
US 2022/0270499 A1 Aug. 25, 2022

Related U.S. Application Data

(63) Continuation of application No. 16/570,760, filed on Sep. 13, 2019, now Pat. No. 11,355,022.

(51) Int. Cl.
*G08G 5/02* (2006.01)
*B64C 39/02* (2023.01)
(Continued)

(52) U.S. Cl.
CPC ............. *G08G 5/025* (2013.01); *B64C 39/02* (2013.01); *G01S 13/913* (2013.01); *G05D 1/042* (2013.01);
(Continued)

(58) Field of Classification Search
CPC .... G08G 5/025; G08G 5/0073; G08G 5/0013; G08G 5/0086; G08G 5/0021;
(Continued)

(56) References Cited

U.S. PATENT DOCUMENTS 7,737,878 B2 6/2010 van Tooren et al.
8,315,794 B1 11/2012 Strelow et al.
(Continued)

FOREIGN PATENT DOCUMENTS

WO 2013/124852 A1 8/2013
WO 2013/139845 A2 9/2013
(Continued)

OTHER PUBLICATIONS

Extended European Search Report dated Jan. 26, 2021 in counterpart European Patent Application No. 20195167.0 (8 pages, in English).

*Primary Examiner* — Bhavesh V Amin
(74) *Attorney, Agent, or Firm* — Fogg & Powers LLC

(57) ABSTRACT

Disclosed are methods, systems, and non-transitory computer-readable medium for landing a vehicle. For instance, the method may include: before a descent transition point, receiving from a service a landing zone confirmation including landing zone location information and an indication that a landing zone is clear; determining a landing flight path based on the landing zone location information; and upon the vehicle starting a descent to the landing zone using the landing flight path: receiving landing zone data from at least one of a radar system, a camera system, an altitude and heading reference system (AHRS), and a GPS system; performing an analysis based on the landing zone data to determine whether an unsafe condition exists; and based on the analysis, computing flight controls for the vehicle to continue the descent or modify the descent.

20 Claims, 14 Drawing Sheets

(51) Int. Cl.
    *G01S 13/91*    (2006.01)
    *G05D 1/04*     (2006.01)
    *G05D 1/06*     (2006.01)
    *G08G 5/00*     (2006.01)
    *G06V 20/10*    (2022.01)
    *G01S 19/15*    (2010.01)

(52) U.S. Cl.
    CPC ......... *G05D 1/0676* (2013.01); *G06V 20/176* (2022.01); *G08G 5/0073* (2013.01); *G01S 19/15* (2013.01)

(58) Field of Classification Search
    CPC ....... B64C 39/02; G01S 13/913; G01S 19/15; G05D 1/042; G05D 1/0676; G05D 1/106; G06V 20/176
    See application file for complete search history.

(56) References Cited

U.S. PATENT DOCUMENTS

| | | | |
|---|---|---|---|
| 8,543,265 B2 | 9/2013 | Ekhaguere et al. | |
| 8,565,944 B1 | 10/2013 | Gershzohn | |
| 8,666,649 B2 | 3/2014 | Otto et al. | |
| 8,965,679 B2 | 2/2015 | Euteneuer et al. | |
| 9,022,324 B1 | 5/2015 | Abhyanker | |
| 9,056,676 B1 | 6/2015 | Wang | |
| 9,262,929 B1 | 2/2016 | Roy et al. | |
| 9,284,062 B2 | 3/2016 | Wang | |
| 9,334,052 B2 | 5/2016 | Pasko et al. | |
| 9,646,503 B2 | 5/2017 | Kawalkar et al. | |
| 9,849,044 B1 * | 12/2017 | Groden | G05D 1/0088 |
| 9,947,232 B2 | 4/2018 | Srivastav et al. | |
| 10,061,328 B2 | 8/2018 | Canoy et al. | |
| 10,134,292 B2 | 11/2018 | Kushawaha | |
| 10,139,825 B2 * | 11/2018 | Groden | G06Q 10/047 |
| 10,185,320 B2 * | 1/2019 | Groden | G07C 5/008 |
| 10,198,955 B1 | 2/2019 | Boyd et al. | |
| 10,332,405 B2 | 6/2019 | Kopardekar | |
| 10,528,050 B2 * | 1/2020 | Groden | G08G 5/0095 |
| 10,586,464 B2 | 3/2020 | Dupray et al. | |
| 10,957,205 B2 | 3/2021 | Li et al. | |
| 11,027,858 B2 | 6/2021 | Di Benedetto et al. | |
| 11,053,021 B2 | 7/2021 | Di Benedetto et al. | |
| 11,256,256 B2 * | 2/2022 | Groden | G05D 1/0676 |
| 11,355,022 B2 * | 6/2022 | Surace | G05D 1/042 |
| 2010/0332136 A1 | 12/2010 | Duggan et al. | |
| 2011/0184590 A1 | 7/2011 | Duggan et al. | |
| 2012/0078451 A1 | 3/2012 | Ohtomo et al. | |
| 2013/0179059 A1 | 7/2013 | Otto et al. | |
| 2013/0282208 A1 | 10/2013 | Mendez-Rodriguez et al. | |
| 2014/0018979 A1 | 1/2014 | Goossen et al. | |
| 2014/0249692 A1 | 9/2014 | Levien et al. | |
| 2015/0142211 A1 | 5/2015 | Shehata et al. | |
| 2015/0323932 A1 | 11/2015 | Paduano et al. | |
| 2016/0070261 A1 | 3/2016 | Heilman et al. | |
| 2016/0117931 A1 | 4/2016 | Chan et al. | |
| 2016/0133138 A1 | 5/2016 | Oldach et al. | |
| 2016/0229554 A1 | 8/2016 | Kawalkar et al. | |
| 2016/0376031 A1 | 12/2016 | Michalski et al. | |
| 2017/0045894 A1 | 2/2017 | Canoy et al. | |
| 2017/0069214 A1 | 3/2017 | Dupray et al. | |
| 2017/0129603 A1 | 5/2017 | Raptopoulos et al. | |
| 2017/0162061 A1 | 6/2017 | Srivastav et al. | |
| 2017/0162062 A1 | 6/2017 | Kushwaha | |
| 2018/0217596 A1 * | 8/2018 | Groden | G08G 5/0056 |
| 2018/0217599 A1 * | 8/2018 | Groden | G06Q 10/0832 |
| 2018/0253097 A1 * | 9/2018 | Groden | G08G 5/003 |
| 2019/0233101 A1 | 8/2019 | Schwindt | |
| 2019/0248487 A1 | 8/2019 | Holtz et al. | |
| 2020/0103901 A1 * | 4/2020 | Groden | G08G 5/0095 |
| 2020/0130864 A1 | 4/2020 | Brockers et al. | |
| 2020/0239138 A1 | 7/2020 | Raptopoulos et al. | |
| 2020/0265726 A1 | 8/2020 | Dupray et al. | |
| 2020/0273353 A1 | 8/2020 | O'Connell et al. | |
| 2020/0365041 A1 | 11/2020 | Kasilya Sudarsan et al. | |
| 2021/0082295 A1 * | 3/2021 | Surace | B64C 39/02 |
| 2021/0183252 A1 | 6/2021 | Bittar et al. | |
| 2022/0107640 A1 * | 4/2022 | Groden | G08G 5/003 |
| 2022/0270499 A1 * | 8/2022 | Surace | B64C 39/02 |

FOREIGN PATENT DOCUMENTS

| | | |
|---|---|---|
| WO | 2014/020556 A1 | 2/2014 |
| WO | 2016/210432 A1 | 12/2016 |
| WO | 2017/068570 A1 | 4/2017 |
| WO | 2019/139845 A1 | 7/2019 |

* cited by examiner

SYSTEMS AND METHODS FOR COMPUTING FLIGHT CONTROLS FOR VEHICLE LANDING

CROSS-REFERENCE TO RELATED APPLICATION(S)

This patent application is a continuation of and claims the benefit of priority to U.S. application Ser. No. 16/570,760, filed Sep. 13, 2019, the entirety of which is incorporated herein by reference.

TECHNICAL FIELD

Various embodiments of the present disclosure relate generally to systems and methods for computing flight controls for vehicle landing and, more particularly, to systems and methods for computing flight controls for vehicle landing using sensor data fusion.

BACKGROUND

The infrastructure and processes of urban air mobility (UAM) may present several challenges. For instance, UAM may require large amounts of data gathering, communication, processing, and reporting to ensure timely, safe, and efficient resource allocation for travel in the UAM environment. For instance, certification authorities may require that operators of UAM vehicles ensure certain tolerances on vehicle operations, such as, among other things, sufficient vehicle spacing within traffic limitations, landing operations within certain limitations, etc. Specifically, landing safely at landing zones may be a challenge due to restrictions in space around the landing zones (either physical space or restrictions on operations near/over buildings, or from noise generation of aircraft), traffic going to or from the landing zones, etc. Therefore, communicating with aircraft as they approach a landing zone (to approach and attempt to land an available (e.g., clear) landing zone), and confirming the landing is proceeding in a safe manner may be challenges.

The present disclosure is directed to overcoming one or more of these above-referenced challenges.

SUMMARY OF THE DISCLOSURE

According to certain aspects of the disclosure, systems and methods are disclosed for computing flight controls for vehicle landing.

For instance, a method may include: before a descent transition point, receiving from a service a landing zone confirmation including landing zone location information and an indication that a landing zone is clear; determining a landing flight path based on the landing zone location information; and upon the vehicle starting a descent to the landing zone using the landing flight path: receiving landing zone data from at least one of a radar system, a camera system, an altitude and heading reference system (AHRS), and a GPS system; performing an analysis based on the landing zone data to determine whether an unsafe condition exists; and based on the analysis, computing flight controls for the vehicle to continue the descent or modify the descent.

A system may include a memory storing instructions; and a processor executing the instructions to perform a process. The process may include: before a descent transition point, receiving from a service a landing zone confirmation including landing zone location information and an indication that a landing zone is clear; determining a landing flight path based on the landing zone location information; and upon the vehicle starting a descent to the landing zone using the landing flight path: receiving landing zone data from at least one of a radar system, a camera system, an altitude and heading reference system (AHRS), and a GPS system; performing an analysis based on the landing zone data to determine whether an unsafe condition exists; and based on the analysis, computing flight controls for the vehicle to continue the descent or modify the descent.

A non-transitory computer-readable medium may store instructions that, when executed by a processor, cause the processor to perform a method. The method may include: before a descent transition point, receiving from a service a landing zone confirmation, the landing zone confirmation including landing zone location information and an indication that a landing zone is clear; determining a landing flight path based on the landing zone location information; and upon the vehicle starting a descent to the landing zone using the landing flight path: receiving landing zone data from at least one of a radar system, a camera system, an altitude and heading reference system (AHRS), and a GPS system; performing an analysis based on the landing zone data to determine whether an unsafe condition exists; and based on the analysis, computing flight controls for the vehicle to continue the descent or modify the descent.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to vehicle landing.

In general, the present disclosure is directed to systems and methods for computing flight controls for vehicle landing using sensor data fusion. For instance, a vehicle of the present disclosure may include a multi-sensor and navigation sensor suite that executes one or more methods of the disclosure. The multi-sensor and navigation sensor suite may include a radar, such as a light weight digital radar or a software Adjustable Radar (SWARS), an on-board camera (e.g., at least two cameras), an Altitude and Heading Reference System (AHRS), and a GPS system. The multi-sensor and navigation sensor suite may, while descending to a landing zone, perform a descent cross-check process. The descent cross-check process may: control the SWARS, the on-board camera, the AHRS, and GPS system to cross-check potential conflicts, confirm the landing zone is clear, and determine whether an unsafe condition is present. For instance, using the descent cross-check process, the vehicle may: control the AHRS to obtain positioning information and alignment information to confirm position and alignment to a landing pad beacon and control the SWARS to obtain altitude and descent rate to confirm altitude and descent rate (e.g., by performing a profile check process); control the camera to acquire a light pattern or identifier pattern (e.g., by performing a vision confirmation process); control the SWARS to scan and map the landing zone to ensure clearance (e.g., by performing a scanning confirmation process to ensure no other vehicles/obstacles are parked at/on the landing zone); and cross check conflicts (if any of the above indicates a potential conflict) or confirm landing pad is clear. If no unsafe conditions are detected, the multi-sensor and navigation sensor suite of the vehicle may continue the descent cross-check process until the vehicle lands on the landing zone. Therefore, the multi-sensor and navigation sensor suite may confirm a landing is proceeding in a safe manner by cross-checking multiple different sensor systems (e.g., radar and cameras) and data sources (AHRS and GPS systems).

While this disclosure describes the systems and methods with reference to aircraft, it should be appreciated that the present systems and methods are applicable to management of vehicles, including those of drones, automobiles, ships, or any other autonomous and/or Internet-connected vehicle.

Figure 1:
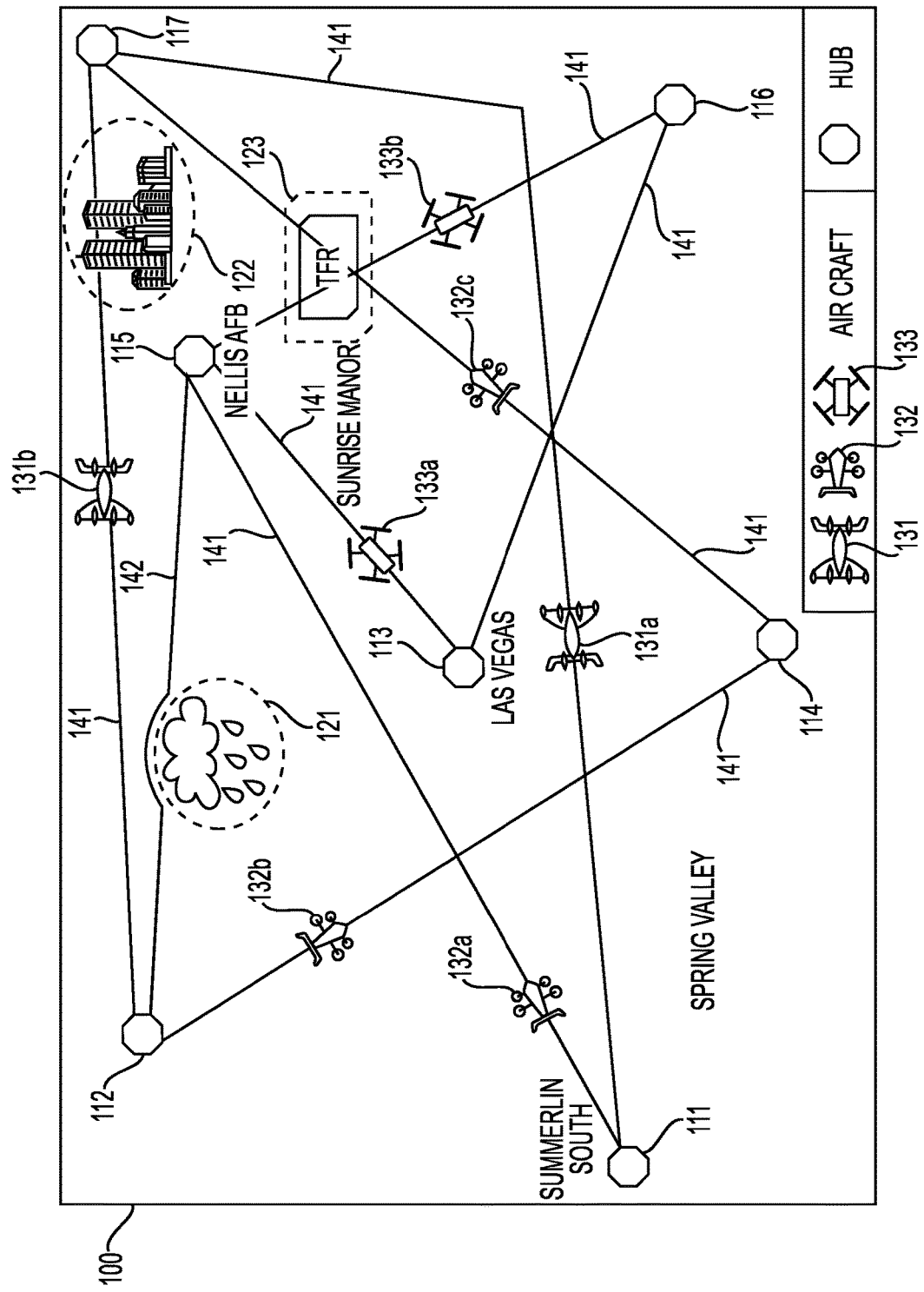
FIG. 1 depicts an example environment in which methods, systems, and other aspects of the present disclosure may be implemented.

As shown in FIG. 1, FIG. 1 depicts an example environment in which methods, systems, and other aspects of the present disclosure may be implemented. The environment of FIG. 1 may include an airspace 100 and one or more hubs 111-117. A hub, such as any one of 111-117, may be a ground facility where aircraft may take off, land, or remain parked (e.g., airport, vertiport, heliport, vertistop, helistop, temporary landing/takeoff facility, or the like). The airspace 100 may accommodate aircraft of various types 131-133 (collectively, "aircraft 131" unless indicated otherwise herein), flying at various altitudes and via various routes 141. An aircraft, such as any one of aircraft 131a-133b, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), a hot-air balloon, a military aircraft, etc. Any one of the aircraft 131a-133b may be connected to one another and/or to one or more of the hubs 111-117, over a communication network, using a vehicle management computer corresponding to each aircraft or each hub. Each vehicle management computer may comprise a computing device and/or a communication device, as described in more detail below in FIGS. 3A and 3B. As shown in FIG. 1, different types of aircraft that share the airspace 100 are illustrated, which are distinguished, by way of example, as model 131 (aircraft 131a and 131b), model 132 (aircraft 132a, 132b, and 132c), and model 133 (aircraft 133a and 133b).

As further shown in FIG. 1, an airspace 100 may have one or more weather constraints 121, spatial restrictions 122 (e.g., buildings), and temporary flight restrictions (TFR) 123. These are exemplary factors that a vehicle management computer of an aircraft may be required to consider and/or analyze in order to derive the most safe and optimal flight trajectory of the aircraft. For example, if a vehicle management computer of an aircraft planning to travel from hub 112 to hub 115 predicts that the aircraft may be affected by an adverse weather condition, such as weather constraint 121, in the airspace, the vehicle management computer may modify a direct path (e.g., the route 141 between hub 112 and hub 115) with a slight curvature away from the weather constraint 121 (e.g., a northward detour) to form a deviated route 142. For instance, the deviated route 142 may ensure that the path and the time of the aircraft (e.g., 4-D coordinates of the flight trajectory) do not intersect any position and time coordinates of the weather constraint 121 (e.g., 4-D coordinates of the weather constraint 121).

As another example, the vehicle management computer of aircraft 131b may predict, prior to take-off, that spatial restriction 122, caused by buildings, would hinder the direct flight path of aircraft 131b flying from hub 112 to hub 117, as depicted in FIG. 1. In response to that prediction, the vehicle management computer of aircraft 131b may generate a 4-D trajectory with a vehicle path that bypasses a 3-dimensional zone (e.g., zone including the location and the altitude) associated with those particular buildings. As yet another example, the vehicle management computer of aircraft 133b may predict, prior to take-off, that TFR 123, as well as some potential 4-D trajectories of another aircraft 132c, would hinder or conflict with the direct flight path of aircraft 133b, as depicted in FIG. 1. In response, the vehicle management computer of aircraft 133b may generate a 4-D trajectory with path and time coordinates that do not intersect either the 4-D coordinates of the TFR 123 or the 4-D trajectory of the other aircraft 132c. In this case, the TFR 123 and collision risk with another aircraft 132c are examples of dynamic factors which may or may not be in effect, depending on the scheduled time of travel, the effective times of TFR, and the path and schedule of the other aircraft 132c. As described in these examples, the 4-D trajectory derivation process, including any modification or re-negotiation, may be completed prior to take-off of the aircraft.

As another example, the vehicle management computer of aircraft 131b may determine to use one of the routes 141 that are set aside for aircraft 131 to use, either exclusively or non-exclusively. The aircraft 131b may generate a 4-D trajectory with a vehicle path that follows one of the routes 141.

As indicated above, FIG. 1 is provided merely as an example environment of an airspace that includes exemplary types of aircraft, hubs, zones, restrictions, and routes. Regarding particular details of the aircraft, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc. Any factor that renders the 4-D trajectory to be modified from the direct or the shortest path between two hubs may be considered during the derivation process.

Figure 2:
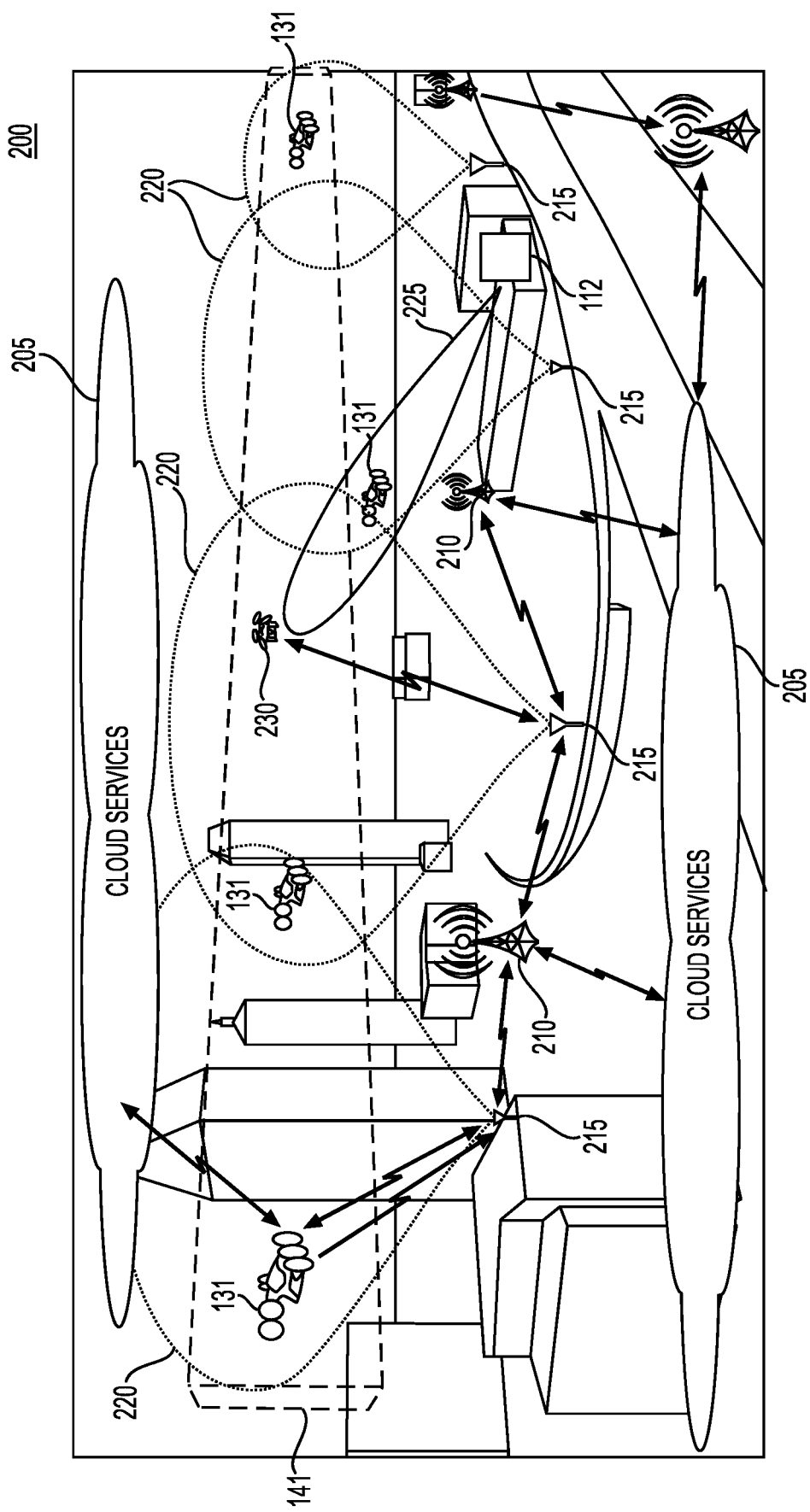
FIG. 2 depicts an exemplary a system, according to one or more embodiments.

FIG. 2 depicts an exemplary a system, according to one or more embodiments. The system 200 depicted in FIG. 2 may include one or more aircraft, such as aircraft 131, one or more intruder aircraft 230, a cloud service 205, one or more communications station(s) 210, and/or one or more ground station(s) 215. The one or more aircraft 131 may be traveling from a first hub (e.g., hub 114) to a second hub (e.g., hub 112) along a route of routes 141. Between, near, and/or on hubs, such as hubs 111-117, the one or more ground station(s) 215 may be distributed (e.g., evenly, based on traffic considerations, etc.) along/near/on/under routes 141. Between, near, and/or on hubs, such as hubs 111-117, the one or more communications station(s) 210 may be distributed (e.g., evenly, based on traffic considerations, etc.). Some (or all) of the one or more ground station(s) 215 may be paired with a communication station 210 of the one or more communications station(s) 210.

Each of the one or more ground station(s) 215 may include a transponder system, a radar system, and/or a datalink system.

The radar system of a ground station 215 may include a directional radar system. The directional radar system may be pointed upward (e.g., from ground towards sky) and the directional radar system may transmit a beam 220 to provide three-dimensional coverage over a section of a route 141. The beam 220 may be a narrow beam. The three-dimensional coverage of the beam 220 may be directly above the ground station 215 or at various skewed angles (from a vertical direction). The directional radar system may detect objects, such as aircraft 131, within the three-dimensional coverage of the beam 220. The directional radar system may detect objects by skin detection. In the case of the ground station 215 being positioned on a hub, such as the hub 112, the directional radar system may transmit a beam 225 to provide three-dimensional coverage over the hub 112. The beam 225 may be also be skewed at an angle (from a vertical direction) to detect objects arriving at, descending to, and landing on the hub 112. The beams 220/225 may be controlled either mechanically (by moving the radar system), electronically (e.g., phased arrays), or by software (e.g., digital phased array "DAPA" radars), or any combination thereof.

The transponder system of a ground station 215 may include an ADS-B and/or a Mode S transponder, and/or other transponder system (collectively, interrogator system). The interrogator system may have at least one directional antenna. The directional antenna may target a section of a route 141. For instance, targeting the section of the route 141 may reduce the likelihood of overwhelming the ecosystem (e.g., aircraft 131) with interrogations, as would be the case if the interrogator system used an omnidirectional antenna. The directional antenna may target a specific section of a route 141 by transmitting signals in a same or different beam pattern as the beam 220/225 discussed above for the radar system. The interrogator system may transmit interrogation messages to aircraft, such as aircraft 131, within the section of the route 141. The interrogation messages may include an identifier of the interrogator system and/or request the aircraft, such as aircraft 131, to transmit an identification message. The interrogator system may receive the identification message from the aircraft, such as aircraft 131. The identification message may include an identifier of the aircraft and/or transponder aircraft data (e.g., speed, position, track, etc.) of the aircraft.

If the radar system detects an object and the transponder system does not receive a corresponding identification message from the object (or does receive an identification message, but it is an invalid identification message, e.g., an identifier of un-authorized aircraft), the ground station 215 may determine that the object is an intruder aircraft 230. The ground station 215 may then transmit an intruder alert message to the cloud service 205. If the radar system detects an object and the transponder system receives a corresponding identification message from the object, the ground station 215 may determine the object is a valid aircraft. The ground station 215 may then transmit a valid aircraft message to the cloud service 205. Additionally or alternatively, the ground station 215 may transmit a detection message based on the detection of the object and whether the ground station 215 receives the identification message ("a response message"); therefore, the ground station 215 may not make a determination as to whether the detected object is an intruder aircraft or a valid aircraft, but instead send the detection message to the cloud service 205 for the cloud service 205 to determine whether the detected object is an intruder aircraft or a valid aircraft.

The datalink system of ground station 215 may communicate with at least one of the one or more communications station(s) 210. Each of the one or more communications station(s) 210 may communicate with at least one of the one or more ground station(s) 215 within a region around the communications station 210 to receive and transmit data from/to the one or more ground station(s) 215. Some or none of the communications station(s) 210 may not communicate directly with the ground station(s) 215, but may instead be relays from other communications station(s) 210 that are in direct communication with the ground station(s) 215. For instance, each of the ground station(s) 215 may communicate with a nearest one of the communications station(s) 210 (directly or indirectly). Additionally or alternatively, the ground station(s) 215 may communicate with a communications station 210 that has a best signal to the ground station 215, best bandwidth, etc. The one or more communications station(s) 210 may include a wireless communication system to communicate with the datalink system of ground station(s) 215. The wireless communication system may enable cellular communication, in accordance with, e.g., 3G/4G/5G standards. The wireless communication system may enable Wi-Fi communications, Bluetooth communications, or other short range wireless communications. Additionally or alternatively, the one or more communications station(s) 210 may communicate with the one or more of the one or more ground station(s) 215 based on wired communication, such as Ethernet, fiber optic, etc.

For instance, a ground station 215 may transmit an intruder alert message or a valid aircraft message (and/or a detection message) to a communications station 210. The communications station 210 may then relay the intruder alert message or the valid aircraft message (and/or the detection message) to the cloud service 205 (either directly or indirectly through another communications station 210).

The one or more communications station(s) 210 may also communicate with one or more aircraft, such as aircraft 131, to receive and transmit data from/to the one or more aircraft. For instance, one or more communications station(s) 210 may relay data between the cloud service 205 and a vehicle, such as aircraft 131.

The cloud service 205 may communicate with the one or more communications station(s) 210 and/or directly (e.g., via satellite communications) with aircraft, such as aircraft 131. The cloud service 205 may provide instructions, data, and/or warnings to the aircraft 131. The cloud service 205 may receive acknowledgements from the aircraft 131, aircraft data from the aircraft 131, and/or other information from the aircraft 131. For instance, the cloud service 205 may provide, to the aircraft 131, weather data, traffic data, landing zone data for the hubs, such as hubs 111-117, updated obstacle data, flight plan data, etc. The cloud service 205 may also provide software as a service (SaaS) to aircraft 131 to perform various software functions, such as navigation services, Flight Management System (FMS) services, etc., in accordance with service contracts, API requests from aircraft 131, etc.

Figure 3A:
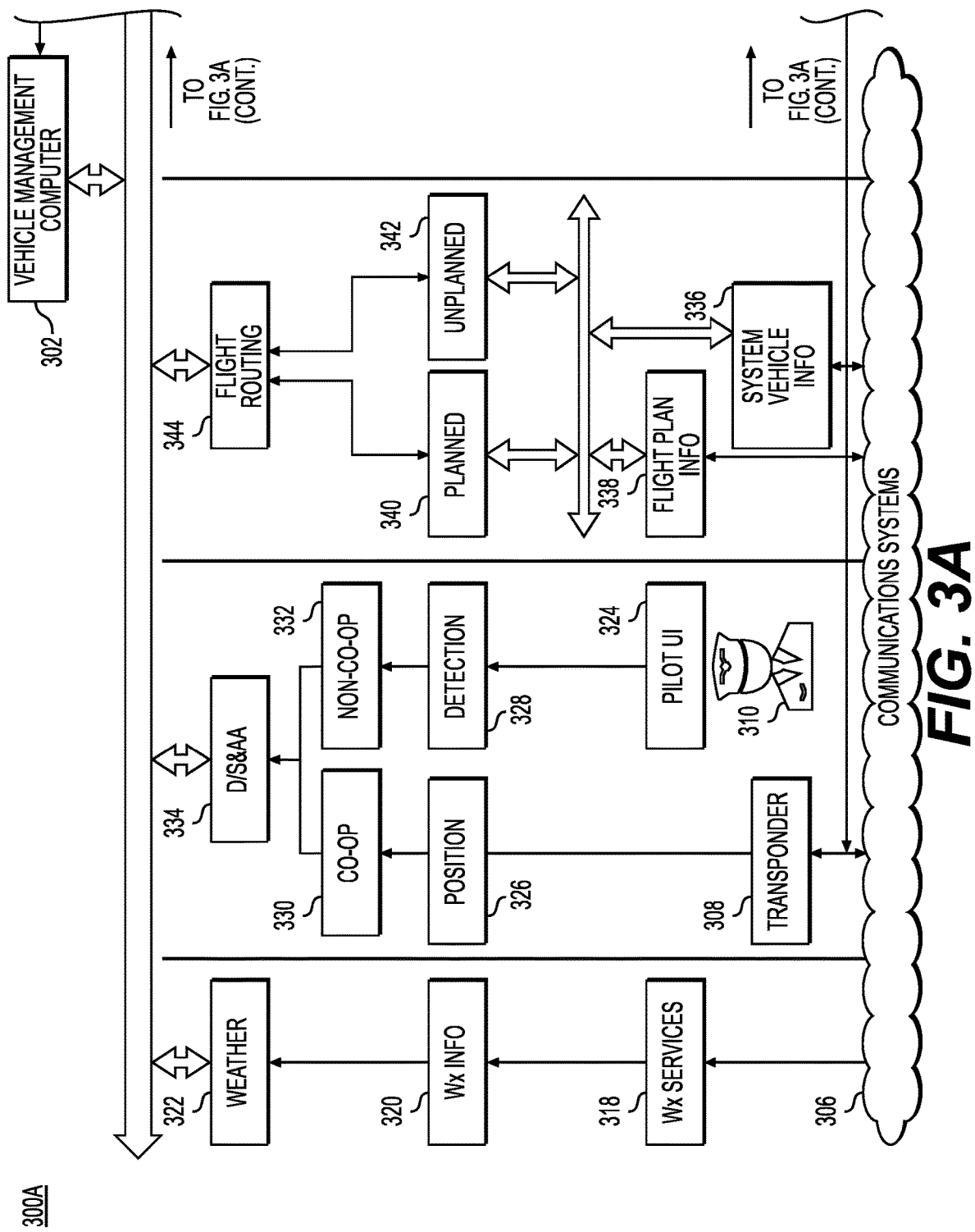
FIGS. 3A and 3B depict exemplary block diagrams of a vehicle of a system, according to one or more embodiments.
Figure 3A:
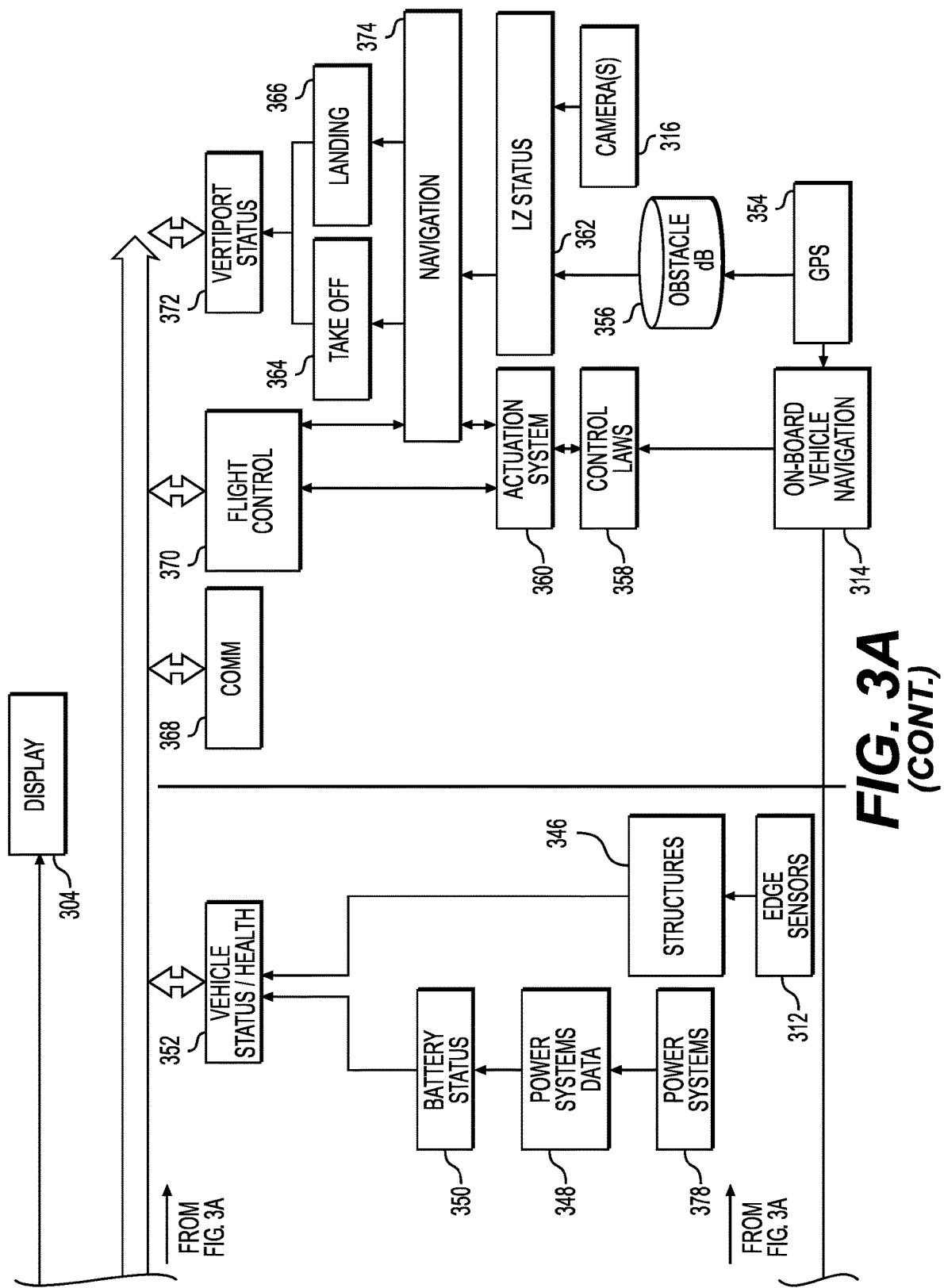
Figure 3B:
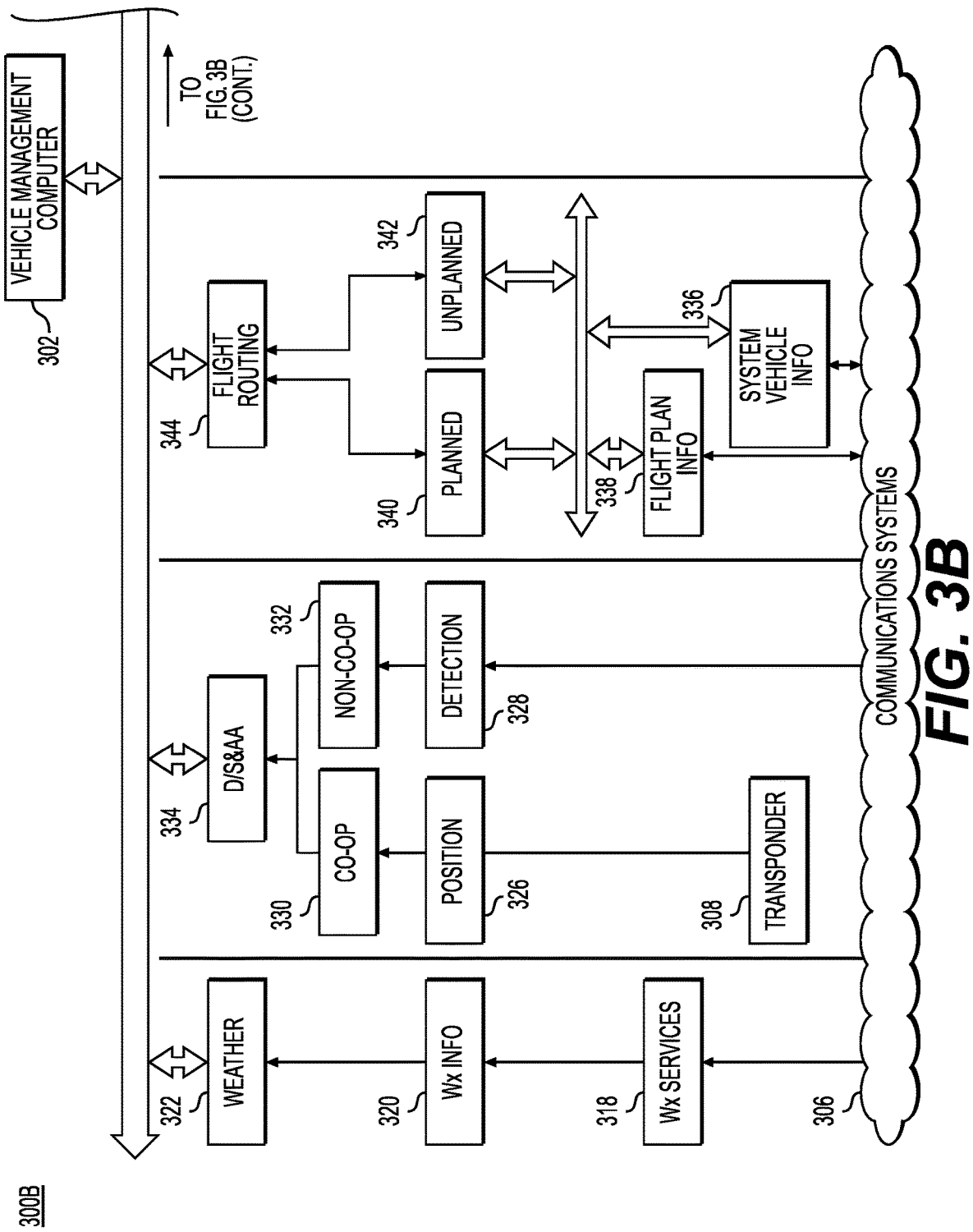
Figure 3B:
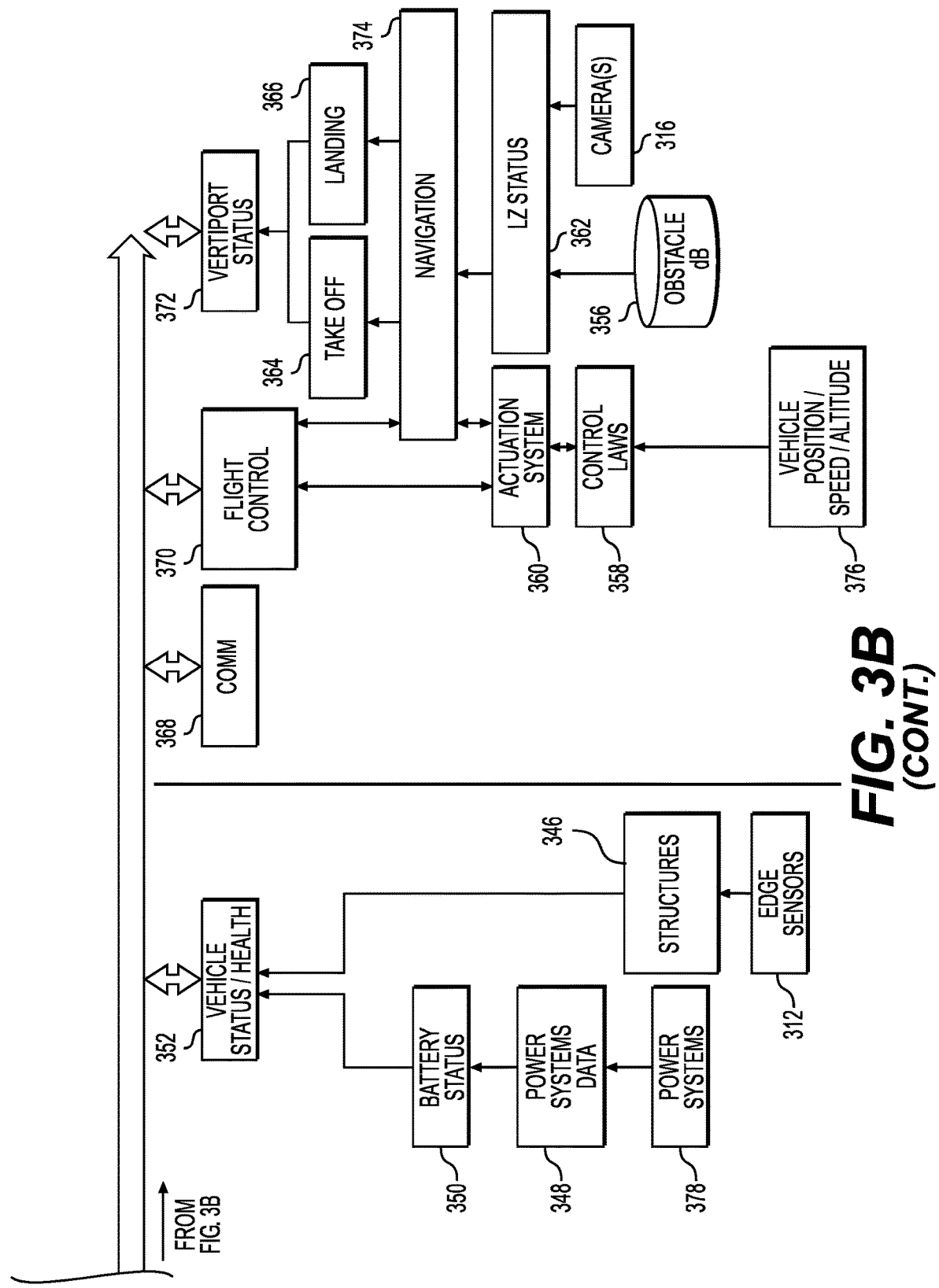

FIGS. 3A and 3B depict exemplary block diagrams of a vehicle of a system, according to one or more embodiments. FIG. 3A may depict a block diagram 300A and FIG. 3B may depict a block diagram 300B, respectively, of a vehicle, such as aircraft 131-133. Generally, the block diagram 300A may depict systems, information/data, and communications between the systems of a piloted or semi-autonomous vehicle, while the block diagram 300B may depict systems, information/data, and communications between the systems of a fully autonomous vehicle. The aircraft 131 may be one of the piloted or semi-autonomous vehicle and/or the fully autonomous vehicle.

The block diagram 300A of an aircraft 131 may include a vehicle management computer 302 and electrical, mechanical, and/or software systems (collectively, "vehicle systems"). The vehicle systems may include: one or more display(s) 304; communications systems 306; one or more transponder(s) 308; pilot/user interface(s) 324 to receive and communicate information from pilots and/or users 310 of the aircraft 131; edge sensors 312 on structures 346 of the aircraft 131 (such as doors, seats, tires, etc.); power systems 378 to provide power to actuation systems 360; camera(s) 316; GPS systems 354; on-board vehicle navigation systems 314; flight control computer 370; and/or one or more data storage systems. The vehicle management computer 302 and the vehicle systems may be connected by one or a combination of wired or wireless communication interfaces, such as TCP/IP communication over Wi-Fi or Ethernet (with or without switches), RS-422, ARINC-429, or other communication standards (with or without protocol switches, as needed).

The vehicle management computer 302 may include at least a network interface, a processor, and a memory, each coupled to each other via a bus or indirectly via wired or wireless connections (e.g., Wi-Fi, Ethernet, parallel or serial ATA, etc.). The memory may store, and the processor may execute, a vehicle management program. The vehicle management program may include a weather program 322, a Detect/See & Assisted Avoidance (D/S & A) program 334, a flight routing program 344, a vehicle status/health program 352, a communications program 368, a flight control program 370, and/or a vertiport status program 372 (collectively, "sub-programs"). The vehicle management program may obtain inputs from the sub-programs and send outputs to the sub-programs to manage the aircraft 131, in accordance with program code of the vehicle management program. The vehicle management program may also obtain inputs from the vehicle systems and output instructions/data to the vehicle systems, in accordance with the program code of the vehicle management program.

The vehicle management computer 302 may transmit instructions/data/graphical user interface(s) to the one or more display(s) 304 and/or the pilot/user interface(s) 324. The one or more display(s) 304 and/or the pilot/user interface(s) 324 may receive user inputs, and transmit the user inputs to the vehicle management computer 302.

The communications systems 306 may include various data links systems (e.g., satellite communications systems), cellular communications systems (e.g., LTE, 4G, 5G, etc.), radio communications systems (e.g., HF, VHF, etc.), and/or wireless local area network communications systems (e.g., Wi-Fi, Bluetooth, etc.). The communications systems 306 may enable communications, in accordance with the communications program 368, between the aircraft 131 and external networks, services, and the cloud service 205, discussed above. An example of the external networks may include a wide area network, such as the internet. Examples of the services may include weather information services 318, traffic information services, etc.

The one or more transponder(s) 308 may include an interrogator system. The interrogator system of the aircraft 131 may be an ADS-B, a Mode S transponder, and/or other transponder system. The interrogator system may have an omnidirectional antenna and/or a directional antenna (interrogator system antenna). The interrogator system antenna may transmit/receive signals to transmit/receive interrogation messages and transmit/receive identification messages. For instance, in response to receiving an interrogation message, the interrogator system may obtain an identifier of the aircraft 131 and/or transponder aircraft data (e.g., speed, position, track, etc.) of the aircraft 131, e.g., from the on-board vehicle navigation systems 314; and transmit an identification message. Contra-wise, the interrogator system may transmit interrogation messages to nearby aircraft; and receive identification messages. The one or more transponder(s) 308 may send messages to the vehicle management computer 302 to report interrogation messages and/or identification messages received from/transmitted to other aircraft and/or the ground station(s) 215. As discussed above, the interrogation messages may include an identifier of the interrogator system (in this case, the aircraft 131), request the nearby aircraft to transmit an identification message, and/or (different than above) transponder aircraft data (e.g., speed, position, track, etc.) of the aircraft 131; the identification message may include an identifier of the aircraft 131 and/or the transponder aircraft data of the aircraft 131.

The edge sensors 312 on the structures 346 of the aircraft 131 may be sensors to detect various environmental and/or system status information. For instance, some of the edge sensors 312 may monitor for discrete signals, such as edge sensors on seats (e.g., occupied or not), doors (e.g., closed or not), etc. of the aircraft 131. Some of the edge sensors 312 may monitor continuous signals, such as edge sensors on tires (e.g., tire pressure), brakes (e.g., engaged or not, amount of wear, etc.), passenger compartment (e.g., compartment air pressure, air composition, temperature, etc.), support structure (e.g., deformation, strain, etc.), etc., of the aircraft 131. The edge sensors 312 may transmit edge sensor data to the vehicle management computer 302 to report the discrete and/or continuous signals.

The power systems 378 may include one or more battery systems, fuel cell systems, and/or other chemical power systems to power the actuation systems 360 and/or the vehicle systems in general. In one aspect of the disclosure, the power systems 378 may be a battery pack. The power systems 378 may have various sensors to detect one or more of temperature, fuel/electrical charge remaining, discharge rate, etc. (collectively, power system data 348). The power systems 378 may transmit power system data 348 to the vehicle management computer 302 so that power system status 350 (or battery pack status) may be monitored by the vehicle status/health program 352.

The actuation systems 360 may include: motors, engines, and/or propellers to generate thrust, lift, and/or directional force for the aircraft 131; flaps or other surface controls to augment the thrust, lift, and/or directional force for the aircraft 131; and/or aircraft mechanical systems (e.g., to deploy landing gear, windshield wiper blades, signal lights, etc.). The vehicle management computer 302 may control the actuation systems 360 by transmitting instructions, in accordance with the flight control program 370, and the actuation systems 360 may transmit feedback/current status of the actuation systems 360 to the vehicle management computer 302 (which may be referred to as actuation systems data).

The camera(s) 316 may include inferred or optical cameras, LIDAR, or other visual imaging systems to record internal or external environments of the aircraft 131. The camera(s) 316 may obtain inferred images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 316 and/or the vehicle management computer 302 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed (a landing zone (LZ) status 362). Additionally or alternatively, the machine vision function may determine whether physical environment (e.g., buildings, structures, cranes, etc.) around the aircraft 131 and/or on/near the routes 141 may be or will be (e.g., based on location, speed, flight plan of the aircraft 131) within a safe flight envelope of the aircraft 131. The imaging data and/or the machine vision outputs may be referred to as "imaging output data." The camera(s) 316 may transmit the imaging data and/or the machine vision outputs of the machine vision function to the vehicle management computer 302. The camera(s) 316 may determine whether elements detected in the physical environment are known or unknown based on obstacle data stored in an obstacle database 356, such as by determining a location of the detected object and determining if an obstacle in the obstacle database has the same location (or within a defined range of distance). The imaging output data may include any obstacles determined to not be in the obstacle data of the obstacle database 356 (unknown obstacles information).

The GPS systems 354 may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. The GNSS receivers may determine positioning information for the aircraft 131. The positioning information may include information about one or more of position (e.g., latitude and longitude, or Cartesian coordinates), altitude, speed, heading, or track, etc. for the vehicle. The GPS systems 354 may transmit the positioning information to the on-board vehicle navigation systems 314 and/or to the vehicle management computer 302.

The on-board vehicle navigation systems 314 may include one or more radar(s), one or more magnetometer(s), an attitude heading reference system (AHRS), and/or one or more air data module(s). The one or more radar(s) may be weather radar(s) to scan for weather and/or DAPA radar(s) (either omnidirectional and/or directional) to scan for terrain/ground/objects/obstacles. The one or more radar(s) (collectively "radar systems") may obtain radar information. The radar information may include information about the local weather and the terrain/ground/objects/obstacles (e.g., aircraft or obstacles and associated locations/movement). The one or more magnetometer(s) may measure magnetism to obtain bearing information for the aircraft 131. The AHRS may include sensors (e.g., three sensors on three axes) to obtain attitude information for the aircraft 131. The attitude information may include roll, pitch, and yaw of the aircraft 131. The air data module(s) may sense external air pressure to obtain airspeed information for the aircraft 131. The radar information, the bearing information, the attitude information, airspeed information, and/or the positioning information (collectively, navigation information) may be transmitted to the vehicle management computer 302.

The weather program 322 may, using the communications systems 306, transmit and/or receive weather information from one or more of the weather information services 318. For instance, the weather program 322 may obtain local weather information from weather radars and the on-board vehicle navigation systems 314, such as the air data module(s). The weather program may also transmit requests for weather information 320. For instance, the request may be for weather information 320 along a route 141 of the aircraft 131 (route weather information). The route weather information may include information about precipitation, wind, turbulence, storms, cloud coverage, visibility, etc. of the external environment of the aircraft 131 along/near a flight path, at a destination and/or departure location (e.g., one of the hubs 111-117), or for a general area around the flight path, destination location, and/or departure location. The one or more of the weather information services 318 may transmit responses that include the route weather information. Additionally or alternatively, the one or more of the weather information services 318 may transmit update messages to the aircraft 131 that includes the route weather information and/or updates to the route weather information.

The D/S & A program 334 may, using the one or more transponders 308 and/or the pilot/user interface(s) 324, detect and avoid objects that may pose a potential threat to the aircraft 131. As an example, the pilot/user interface(s) 324 may receive user input(s) from the pilots and/or users of the vehicle 310 (or radar/imaging detection) to indicate a detection of an object; the pilot/user interface(s) 324 (or radar/imaging detection) may transmit the user input(s) (or radar or imaging information) to the vehicle management computer 302; the vehicle management computer 302 may invoke the D/S & A program 334 to perform an object detection process 328 to determine whether the detected object is a non-cooperative object 332 (e.g., it is an aircraft that is not participating in transponder communication); optionally, the vehicle management computer 302 may determine a position, speed, track for the non-cooperative object 332 (non-cooperative object information), such as by radar tracking or image tracking; in response to determining the object is a non-cooperative object 332, the vehicle management computer 302 may determine a course of action, such as instruct the flight control program 370 to avoid the non-cooperative object 332. As another example, the one or more transponder(s) 308 may detect an intruder aircraft (such as intruder aircraft 230) based on an identification message from the intruder aircraft; the one or more transponder(s) 308 may transmit a message to the vehicle management computer 302 that includes the identification message from the intruder aircraft; the vehicle management computer 302 may extract an identifier and/or transponder aircraft data from the identification message to obtain the identifier and/or speed, position, track, etc. of the intruder aircraft; the vehicle management computer 302 may invoke the D/S & A program 334 to perform a position detection process 326 to determine whether the detected object is a cooperative object 330 and its location, speed, heading, track, etc.; in response to determining the object is a cooperative object 330, the vehicle management computer 302 may determine a course of action, such as instruct the flight control program 370 to avoid the cooperative object 330. For instance, the course of action may be different or the same for non-cooperative and cooperative objects 330/332, in accordance with rules based on regulations and/or scenarios.

The flight routing program 344 may, using the communications systems 306, generate/receive flight plan information 338 and receive system vehicle information 336 from the cloud service 205. The flight plan information 338 may include a departure location (e.g., one of the hubs 111-117), a destination location (e.g., one of the hubs 111-117), intermediate locations (if any) (e.g., waypoints or one or more of the hubs 111-117) between the departure and destination locations, and/or one or more routes 141 to be used (or not used). The system vehicle information 336 may include other aircraft positioning information for other aircraft with respect to the aircraft 131 (called a "receiving aircraft 131" for reference). For instance, the other aircraft positioning information may include positioning information of the other aircraft. The other aircraft may include: all aircraft 131-133 and/or intruder aircraft 230; aircraft 131-133 and/or intruder aircraft 230 within a threshold distance of the receiving aircraft 131; aircraft 131-133 and/or intruder aircraft 230 using a same route 141 (or is going to use the same route 141 or crossing over the same route 141) of the receiving aircraft; and/or aircraft 131-133 and/or intruder aircraft 230 within a same geographic area (e.g., city, town, metropolitan area, or sub-division thereof) of the receiving aircraft.

The flight routing program 344 may determine or receive a planned flight path 340. The flight routing program 344 may receive the planned flight path 340 from another aircraft 131 or the cloud service 205 (or other service, such as an operating service of the aircraft 131). The flight routing program 344 may determine the planned flight path 340 using various planning algorithms (e.g., flight planning services on-board or off-board the aircraft 131), aircraft constraints (e.g., cruising speed, maximum speed, maximum/minimum altitude, maximum range, etc.) of the aircraft 131, and/or external constraints (e.g., restricted airspace, noise abatement zones, etc.). The planned/received flight path may include a 4-D trajectory of a flight trajectory with 4-D coordinates, a flight path based on waypoints, any suitable flight path for the aircraft 131, or any combination thereof, in accordance with the flight plan information 338 and/or the system vehicle information 336. The 4-D coordinates may include 3-D coordinates of space (e.g., latitude, longitude, and altitude) for a flight path and time coordinate.

The flight routing program 344 may determine an unplanned flight path 342 based on the planned flight path 340 and unplanned event triggers, and using the various planning algorithms, the aircraft constraints of the aircraft 131, and/or the external constraints. The vehicle management compute 302 may determine the unplanned event triggers based on data/information the vehicle management compute 302 receives from other vehicle systems or from the cloud service 205. The unplanned event triggers may include one or a combination of: (1) emergency landing, as indicated by the vehicle status/health program 352 discussed below or by a user input to one or more display(s) 304 and/or the pilot/user interface(s) 324; (2) intruder aircraft 230, cooperative object 330, or non-cooperative object 332 encroaching on a safe flight envelope of the aircraft 131; (3) weather changes indicated by the route weather information (or updates thereto); (4) the machine vision outputs indicating a portion of the physical environment may be or will be within the safe flight envelope of the aircraft 131; and/or (5) the machine vision outputs indicating a landing zone is obstructed.

Collectively, the unplanned flight path 342/the planned flight path 340 and other aircraft positioning information may be called flight plan data.

The vehicle status/health program 352 may monitor vehicle systems for status/health, and perform actions based on the monitored status/health, such as periodically report status/health, indicate emergency status, etc. The vehicle may obtain the edge sensor data and the power system data 348. The vehicle status/health program 352 may process the edge sensor data and the power system data 348 to determine statuses of the power system 378 and the various structures and systems monitored by the edge sensors 312, and/or track a health of the power system 378 and structures and systems monitored by the edge sensors 312. For instance, the vehicle status/health program 352 may obtain the power systems data 348; determine a battery status 350; and perform actions based thereon, such as reduce consumption of non-essential systems, report battery status, etc. The vehicle status/health program 352 may determine an emergency landing condition based on one or more of the power system 378 and structures and systems monitored by the edge sensors 312 has a state that indicates the power system 378 and structures and systems monitored by the edge sensors 312 has or will fail soon. Moreover, the vehicle status/health program 352 may transmit status/health data to the cloud service 205 as status/health messages (or as a part of other messages to the cloud service). The status/health data may include the actuation systems data, all of the edge sensor data and/or the power system data, portions thereof, summaries of the edge sensor data and the power system data, and/or system status indicators (e.g., operating normal, degraded wear, inoperable, etc.) based on the edge sensor data and the power system data.

The flight control program 370 may control the actuation system 360 in accordance with the unplanned flight path 342/the planned flight path 340, the other aircraft positioning information, control laws 358, navigation rules 374, and/or user inputs (e.g., of a pilot if aircraft 131 is a piloted or semi-autonomous vehicle). The flight control program 370 may receive the planned flight path 340/unplanned flight path 342 and/or the user inputs (collectively, "course"), and determine inputs to the actuation system 360 to change speed, heading, attitude of the aircraft 131 to match the course based on the control laws 358 and navigation rules 374. The control laws 358 may dictate a range of actions possible of the actuation system 360 and map inputs to the range of actions to effectuate the course by, e.g., physics of flight of the aircraft 131. The navigation rules 374 may indicate acceptable actions based on location, waypoint, portion of flight path, context, etc. (collectively, "circumstance"). For instance, the navigation rules 374 may indicate a minimum/maximum altitude, minimum/maximum speed, minimum separation distance, a heading or range of acceptable headings, etc. for a given circumstance.

The vertiport status program 372 may control the aircraft 131 during takeoff (by executing a takeoff process 364) and during landing (by executing a landing process 366). The takeoff process 364 may determine whether the landing zone from which the aircraft 131 is to leave and the flight environment during the ascent is clear (e.g., based on the control laws 358, the navigation rules 374, the imaging data, the obstacle data, the unplanned flight path 342/the planned flight path 340, the other aircraft positioning information, user inputs, etc.), and control the aircraft or guide the pilot through the ascent (e.g., based on the control laws 358, the navigation rules 374, the imaging data, the obstacle data, the flight plan data, user inputs, etc.). The landing process 366 may determine whether the landing zone on which the aircraft 131 is to land and the flight environment during the descent is clear (e.g., based on the control laws 358, the navigation rules 374, the imaging data, the obstacle data, the flight plan data, user inputs, the landing zone status, etc.), and control the aircraft or guide the pilot through the descent (e.g., based on the control laws 358, the navigation rules 374, the imaging data, the obstacle data, the flight plan data, user inputs, the landing zone status, etc.).

The one or more data storage systems may store data/information received, generated, or obtained onboard the aircraft. The one or more data storage systems may also store software for one or more of the computers onboard the aircraft.

The block diagram 300B may be the same as the block diagram 300A, but the block diagram 300B may omit the pilot/user interface(s) 324 and/or the one or more displays 304, and include a vehicle position/speed/altitude system 376. The vehicle position/speed/altitude system 376 may include or not include the on-board vehicle navigation systems 314 and/or the GPS systems 354, discussed above. In the case that the vehicle position/speed/altitude system 376 does not include the on-board vehicle navigation systems 314 and/or the GPS systems 354, the vehicle position/speed/altitude system 376 may obtain the navigation information from the cloud service 205.

In one aspect of the disclosure, the landing process 366 of the vertiport status program 372 may include: before a descent transition point, receive from the cloud service 205 a landing zone confirmation message; determine a landing flight path, e.g., based on landing zone location information; start a descent to the landing zone using the landing flight path. The landing process 366 may further include, during the descent: receive landing zone data from at least one of a radar system, a camera system, or a messaging system; perform an analysis based on the landing zone data to determine whether an unsafe condition exists; and based on the analysis, compute flight controls for the vehicle to continue the descent or modify the descent.

Figure 4:
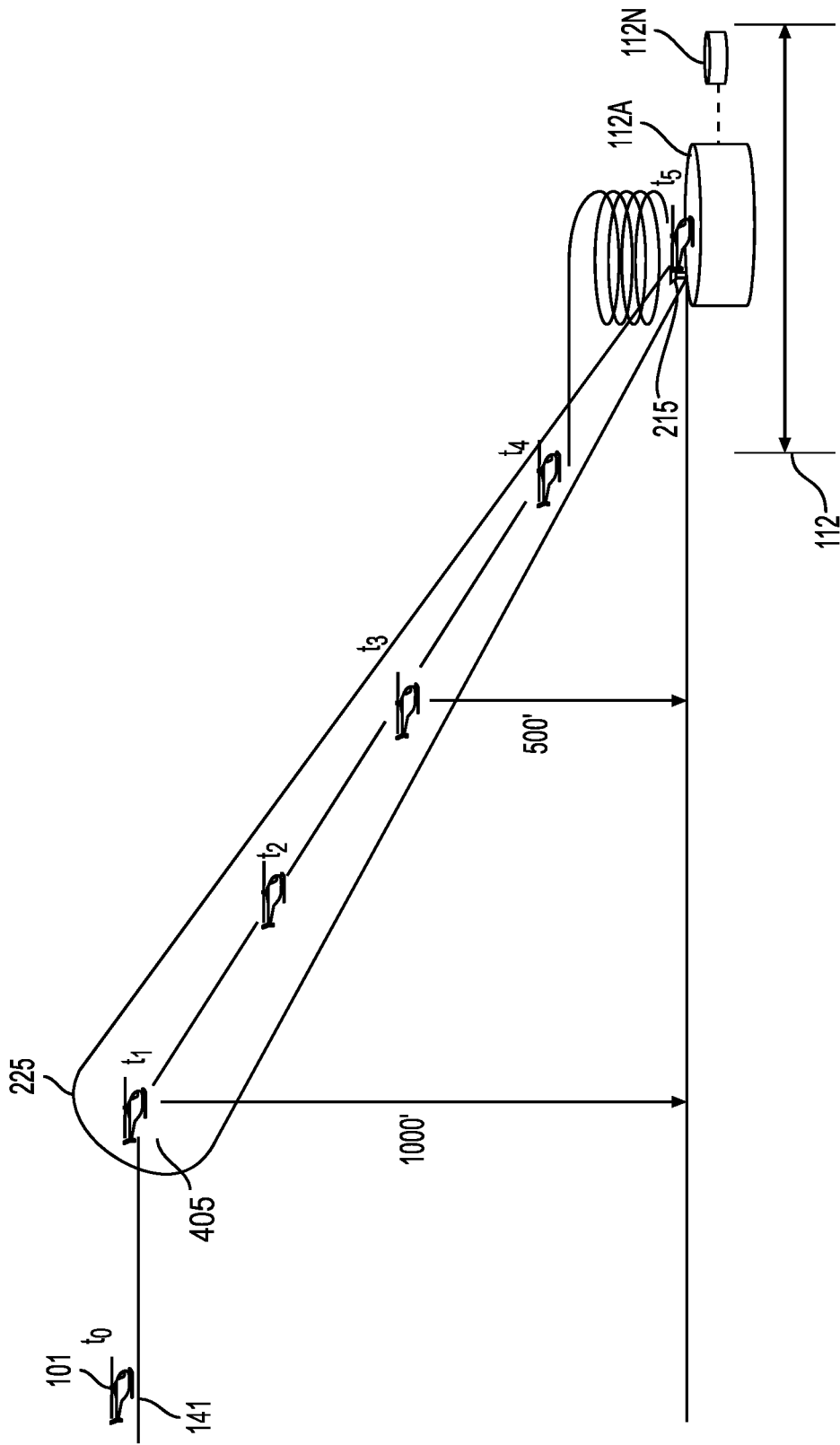
FIGS. 4 and 5 depict exemplary scenarios for vehicle landing using sensor data fusion, according to one or more embodiments.
Figure 5:
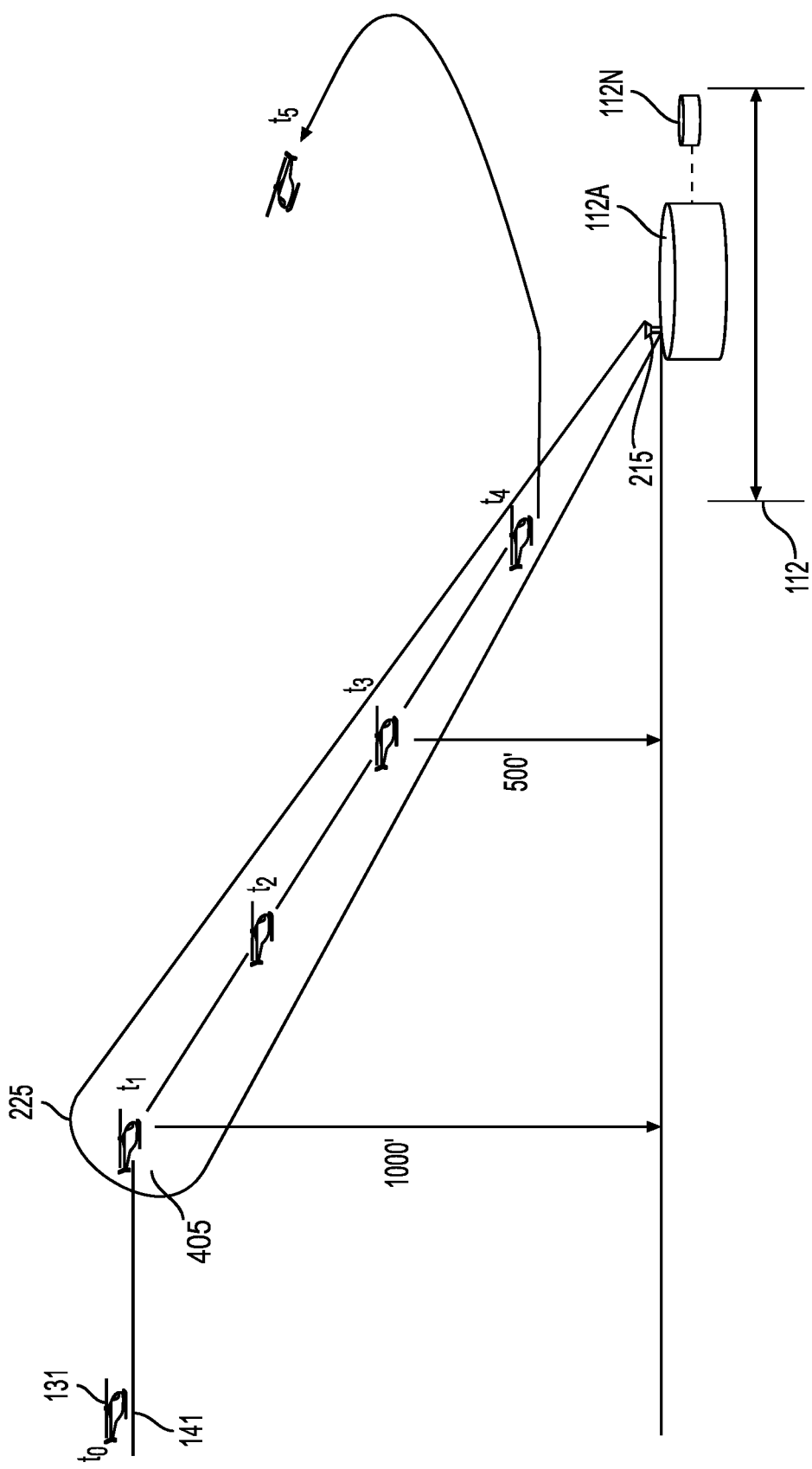

For instance, FIGS. 4 and 5 may depict exemplary scenarios for computing flight controls for vehicle landing using sensor data fusion, according to one or more embodiments. In FIG. 4, a vehicle 101 (e.g., one of the aircraft 131) on a route 141 to hub 112 may receive the landing zone confirmation message before, at, or after the descent transition point 405. For instance, in one aspect of the disclosure, the vehicle 101 may receive the landing zone confirmation message at time t0 before descent transition point 405; the vehicle 101 may receive the landing zone confirmation at time t1 at the descent transition point 405; the vehicle 101 may receive the landing zone confirmation message at time t2, t3, or t4 after the descent transition point 405. The landing zone confirmation message may including landing zone location information and an indication that a landing zone is clear or not, or change from original to another landing zone. The landing zone location information may include a GPS coordinate for the landing zone. While the descent transition point 405 is depicted as coinciding with an edge of beam 225 of a directional radar system of a ground station 215 for the hub 112 (or the landing zone 112A of a plurality of landing zones 112A through 112N for the hub 112), the descent transition point 405 may be outside the beam 225, closer to the hub 112, or set based on circumstances for the hub (e.g., for clearance from obstacles).

With or without the landing zone confirmation message, the vehicle 101 may determine a landing flight path (e.g., based on the landing zone location information and/or based on the control laws 358, the navigation rules 374, the imaging data, the obstacle data, the flight plan data, user inputs, the landing zone status, etc.) from the route 141 (or from outside of a route 141) to the descent transition point 405 to the landing zone. The vehicle 101 may then start a descent to the landing zone using the landing flight path.

The landing process 366 may further include, during the descent: confirm position and alignment; lock onto an approach beacon; and perform a descent cross-check process to determine whether an unsafe condition is present. The landing process 366 may further include, during the descent, based on an output of the descent cross-check process, computing flight controls for the vehicle to continue the descent or modify the descent.

To confirm position and alignment, the landing process 366 may control the radar system to receive signals from and/or lock onto signals from a landing pad beacon; analyze the signals to determine whether the vehicle 101 has selected the correct landing zone (e.g., corresponds to the landing zone in the landing zone confirmation message); obtain positioning and/or orientation information from, e.g., the cloud service 205 or from on board systems (e.g., AHRS, radar, cameras, GPS, etc.); compare the positioning and/or orientation information to expected navigation data and/or radar data to confirm proper alignment and position for approach; and, in response to determining the correct landing zone has been selecting and/or the comparison indicates a proper alignment and position for approach, then confirming the vehicle 101 may proceed with the landing approach. The landing pad beacon may be the same as the directional radar system of a ground station 215 for the hub 112 or the landing pad beacon may be a different directional radar system for the hub 112. The expected navigation data and/or radar data may be landing zone specific information for acceptable approach positions and orientations stored on board the vehicle 101, received from the cloud service 205, or received in the landing zone confirmation message. For instance, the landing zone beacon may be a DAPA radar specifically programmed to transmit an encoded signal (e.g., a unique encoded signal) to the vehicle 101 to signify landing pad 112A.

The obtaining the positioning and/or orientation information may include requesting and receiving from, e.g., the cloud service 205 or the on-board systems the positioning and/or orientation information; and determining one or a combination of: (1) distance from the landing zone beacon; (2) a relative orientation from the landing zone beacon; and/or (3) a position and/or altitude with respect to the landing zone beacon. The positioning and/or orientation information may include the bearing information, the attitude information, the airspeed information, and/or the positioning information of the navigation information to indicate the position (e.g., GPS coordinate), altitude, orientation, speed (descent rate and/or other speed vector components), airspeed, and/or bearing of the vehicle 101. The positioning and/or orientation information may further include altitude (e.g., based on range finding to a landing zone) and a descent rate (e.g., a time derivate of the altitude), and/or altitude and descent rate based on the radar signals from the radar system.

To perform the descent cross-check process, the vehicle 101 may receive landing zone data from at least one of a radar system, a camera system, or a messaging system; and perform an analysis based on the landing zone data to determine whether an unsafe condition exists.

For instance, the vehicle 101 may periodically (e.g., at predetermined intervals) or continuously receive the landing zone data and perform the analysis. In FIG. 4, the vehicle 101 may never determine an unsafe condition so the vehicle continues the descent until landing at time t5; meanwhile in FIG. 5, the vehicle 101 may determine an unsafe condition at time t4, and perform a maneuver to modify the descent, and perform subsequent vehicle operations at time t5. For instance, the computing the flight control for the vehicle to continue the descent or modify the descent includes, may include: continuing the descent if no unsafe condition exists and modifying the descent if the unsafe condition exists. The modifying the descent, may include one or more of: decreasing descent rate, performing a maneuver to a holding area or alternative landing zone, or re-attempt the descent. For instance, the decreasing the descent rate may reduce the descent rate to greater than zero, zero, or less than zero (e.g., the vehicle is gaining altitude). As an example, the vehicle 101 may invoke the flight control program 370 to control the actuation system 360 to follow a descent flight path (if no unsafe condition), or to control the actuation system 360 to modify the descent (e.g., reduce rate or descent, move to holding area, etc.).

Specifically, the vehicle 101 may (in accordance the descent cross-check process and the landing process 366): receive descent data from one or more of a plurality of systems (which may correspond to the landing zone data discussed above); perform an analysis of the descent data to determine whether an unsafe condition is present (e.g., determine whether an analysis result indicates an unsafe condition is present); in response to determining the analysis result indicates an unsafe condition, perform a maneuver to a holding area, an alternate landing zone, or to re-attempt the landing zone; in response to determining the analysis result does not indicate an unsafe condition, determine whether the landing is complete; in response to determining the landing is not complete, receive more descent data and perform the analysis again; and in response to determining the landing is complete, transmit a success message to the cloud service 205.

The descent cross-check process may perform one or more distinct cross-check processes, such a first process, a second process, and/or a third process. The descent-cross check process may perform the first process, the second process, and/or the third process in parallel or in sequence, or the descent cross-check process may perform only one, two, or all three of the first process, the second process, or the third process. The first process may be a separate process for the receiving descent data and performing an analysis; the second process may be a first sequential process for the receiving descent data and performing an analysis; the third process may be a second sequential process for the receiving descent data and performing an analysis.

For instance, the separate process may independently control a first and second sensor system to detect an unsafe condition by executing a first sensor process and a second sensor process separately; the first sequential process may perform the first sensor process then, under certain circumstances, perform the second sensor process; the second sequential process may perform the second sensor process then, under certain circumstances, perform the first sensor process.

The first sensor process may perform a profile check process and one of a scanning confirmation process or a vision confirmation process; the second sensor process may perform the other one of the scanning confirmation process or the vision confirmation process. The scanning confirmation process may control the radar systems of the vehicle 101 to obtain radar data from (the radar information of) the radar systems of the vehicle 101. The vision confirmation process may control the camera(s) 316 to obtain the imaging output data from (the camera(s) 316) the vehicle 101. The profile check process may: control the on-board vehicle navigation systems 314 to obtain navigation data from (the navigation information of) the on-board vehicle navigation systems 314 of the vehicle 101 and/or control the radar systems of the vehicle 101 to obtain radar data from (the radar information of) the radar systems of the vehicle 101; and determine whether the descent stays within a descent profile.

With respect to the profile check process, the profile check process may also obtain the navigation data and the radar data, as discussed above with respect to locking onto the landing zone beacon signal. The profile check process may: obtain the navigation data and/or the radar data; compare the navigation data to the radar data to for each data type to check that each is reporting the same or within a threshold similarity of each other; and compare the navigation data and/or the radar data to a profile expected data set. The profile expected data set may include the same data types as the navigation data and the radar data (e.g., position, altitude, descent rate, etc.) based on a previous reading of the navigation data and the radar data, adjusted for expected changes in data (e.g., based on velocity, acceleration, rotation, etc. and aerodynamics). The profile check process may determine, based on the comparison, whether there is a substantial change from the current navigation data and/or radar data to the profile expected data set. For instance, a substantial change may be that a position/altitude/descent rate is more than a threshold amount from a position/altitude/descent rate of the profile expected data set. In response to detecting the substantial change, the profile check process may determine an unsafe condition.

Additionally or alternatively, the profile expected data may include descent conditions. The descent conditions may include one or a combination of: (1) a flight envelope condition (e.g., a three-dimensional volume in which the vehicle 101 must remain), (2) a descent rate condition (e.g., descent rate must be less than a predetermined value, and the predetermined value may vary according to an altitude of the vehicle, such as the descent rate must be slower as the altitude decreases); and/or (3) heading, pitch, and/or roll conditions (e.g., a heading/pitch/roll of the vehicle 101 must be between a first predetermined degree and a second predetermine degree). The profile check process may determine whether one or more of the above conditions are satisfied; and, in response to determining the one or more conditions are not satisfied, determine an unsafe condition.

One of skill in the art would realize that comparisons that indicate substantial changes and/or conditions may be varied and determined in numerous manners, and generally the comparison and/or conditions are to confirm that the vehicle 101 is descending as expected. For example, the comparison/conditions may determine whether wind gusts are causing the descent rate to increase beyond a threshold amount, determine whether the vehicle 101 is drifting away from the landing zone, etc.

With respect to the scanning confirmation process, the scanning confirmation process may control the radar systems to scan and map the landing zone, and include landing zone mapping data in the radar data. The landing zone mapping data may include radar mapping data that indicates a two-dimensional area/three-dimensional structural of the landing zone (e.g., a plurality of radar readings from different segments of the scan of the landing zone that indicate positions of the surface of the landing zone and/or of obstacles on the landing zone). The scanning confirmation process may compare the landing zone mapping data to an expected landing zone mapping data (which may be included in a scanning expected data set). The expected landing zone mapping data may indicate the two-dimensional area/three-dimensional structure of the landing zone when the landing zone is clear. The expected landing zone mapping data may be provided by the cloud service 205, either in route to the hub 112 or in the landing zone confirmation message. The expected landing zone mapping data may be updated by the cloud service 205 if the cloud service 205 becomes aware of changes to the two-dimensional area/three-dimensional structure of the landing zone, and the cloud service 205 may provide the most recent two-dimensional area/three-dimensional structure of the landing zone to the vehicle 101. The expected landing zone mapping data may, alternatively, be based on the first/most recent reading of the landing zone mapping data, or a reading between the first and most recent reading, or any combination thereof. The scanning confirmation process may determine, based on the comparison, whether there is a substantial change from the current reading of the landing zone mapping data to the expected landing zone mapping data. For instance, a substantial change may be that a segment (e.g., a grouping of radar readings) of the two-dimensional area/three-dimensional structure of the current reading of the landing zone mapping data is more than a threshold distance from points in the two-dimensional area/three-dimensional structure of the expected landing zone mapping data. One of skill in the art would realize that comparisons that indicate substantial changes may be varied and determined in numerous manners, and generally the scanning and mapping described herein is to determine whether an obstruction has entered the landing zone of the vehicle 101. If the scanning confirmation process determines a substantial change is present, the scanning confirmation process may determine an obstacle (or potential conflict) is present.

With respect to the vision confirmation process, the imaging output data may include the imaging data and/or the machine vision outputs, where the imaging data may include one or more of the inferred images; the optical images; and/or the LIDAR point cloud data. In one aspect of the disclosure, the vision confirmation process may obtain the imaging data and/or the machine vision outputs; and analyze the imaging data and/or the machine vision outputs to determine whether an expected symbol or representation (vision expected data) is present. The expected symbol or representation may be a light pattern on the landing zone, or an identifier pattern on the landing zone. The landing zones of the hubs 111-117 may have the same or different (e.g., unique) light patterns or identifier patterns. The light patterns may be visible or inferred light patterns from light sources (e.g., lights/LEDS, lamps, etc.) on the landing zone. The identifier patterns may be visible or inferred patterns on a surface of the landing zones of the hubs 111-117, applied by, e.g., paint or other material. To determine whether an expected symbol or representation is present, the vision confirmation process may analyze the imaging data and/or the machine vision outputs to determine whether similar patterns to the light pattern or identifier pattern are present in the imaging data or the machine vision outputs. For instance, the vision confirmation process may use a machine learning algorithm or pattern detection algorithm to detect and match patterns to the light pattern or identifier pattern for the landing zone of the hub 112. If the expected symbol or representation is determined to be present in the imaging data or the machine vision outputs, the vision confirmation process may determine the landing zone is clear, otherwise the vision confirmation process may determine an obstacle (or potential conflict) is present.

In another aspect of the disclosure, the vision confirmation process may also, separately or as a part of the above process, control the camera(s) to scan and map the landing zone using the LIDAR system of the vehicle, and include LIDAR landing zone data in the imaging data. The LIDAR landing zone data may include LIDAR point cloud data that indicates a two-dimensional area/three-dimensional structural of the landing zone (e.g., a plurality of LIDAR point readings from different segments of the scan of the landing zone that indicate positions of the surface of the landing zone and/or of obstacles on the landing zone). The vision confirmation process may compare the LIDAR landing zone data to an expected LIDAR landing zone data (which may be included in the vision expected data set). The expected LIDAR landing zone data may indicate the two-dimensional area/three-dimensional structure of the landing zone. The expected LIDAR landing zone data may be provided by the cloud service 205, either in route to the hub 112 or in the landing zone confirmation message. The expected LIDAR landing zone data may be updated by the cloud service 205 if the cloud service 205 becomes aware of changes to the two-dimensional area/three-dimensional structure of the landing zone, and the cloud service 205 may provide the most recent two-dimensional area/three-dimensional structure of the landing zone to the vehicle 101. The expected LIDAR landing zone data may, alternatively, be based on the first/most recent reading of the expected LIDAR landing zone data, or a reading between the first and most recent reading, or any combination thereof. The vision confirmation process may determine, based on the comparison, whether there is a substantial change from the current reading of the LIDAR landing zone data to the expected LIDAR landing zone data. For instance, a substantial change may be that a segment (e.g., a grouping of LIDAR point readings) of the two-dimensional area/three-dimensional structure of the current reading of the LIDAR landing zone data is more than a threshold distance from points in the two-dimensional area/three-dimensional structure of the expected LIDAR landing zone data. One of skill in the art would realize that comparisons that indicate substantial changes may be varied and determined in numerous manners, and generally the scanning and mapping by the LIDAR system described herein is to determine whether an obstruction has entered the landing zone of the vehicle 101. If the vision confirmation process determines a substantial change is present, the vision confirmation process may determine an obstacle (or potential conflict) is present.

In the case of the separate process, the descent cross-check process may: determine whether an obstacle is present using either (or only if both) the first process and the second process to determine an obstacle is present; and in response to determining an obstacle is present determine an unsafe condition is present. In the case of the first sequential process, the descent cross-check process may: determine whether a potential conflict is present using the first process (e.g., the altitude process or the vision process determines an object is present as a potential conflict); in response to the first process determining a potential conflict (e.g., the altitude process or the vision process determines an object is present), then the second process may confirm whether the potential conflict is an obstacle (e.g., using the other of the altitude process or the vision process to determine an object is present); and in response to confirming the potential conflict is an obstacle, determine an unsafe condition. In the case of the second sequential process, the descent cross-check process may: determine whether a potential conflict is present using the second process (e.g., the altitude process or the vision process determines an object is present as a potential conflict); in response to the second process determining a potential conflict (e.g., the altitude process or the vision process determines an object is present), then the first process may confirm whether the potential conflict is an obstacle (e.g., using the other of the altitude process or the vision process to determine an object is present); and in response to confirming the potential conflict is an obstacle, determine an unsafe condition.

As an example, the vehicle 101 may be equipped with a multi-sensor and navigation sensor suite. The multi-sensor and navigation sensor suite may include a software Adjustable Radar (SWARS), an on-board camera (e.g., at least two cameras), an Altitude and Heading Reference System (AHRS), and a GPS system. The SWARS may perform multiple functions, including target detection and tracking, ground mapping, and radar altimetry. The on-board cameras may include or be supported by an onboard image processor that analyzes imaging data to detect obstacles and/or patterns on landing zones. The AHRS may determine an attitude and heading of the vehicle 101 (e.g., roll, pitch, heading). The GPS system may determine a position of the vehicle 101 (e.g., GPS coordinates). The multi-sensor and navigation sensor suite may: prior to the vehicle 101 approaching the descent transition point 405, receive a landing zone confirmation message (indicating landing zone location and the landing zone is clear, occupied, or change from original to backup landing pad) from the cloud service 205; before or at the descent transition point 405, receive a final confirmation of a clear landing zone from the cloud service 205 (e.g., another landing zone confirmation message); determine a descent flight path, by loading the landing zone location (e.g., GPS position) into the flight routing program 344; and start the descent using the descent flight path. The vehicle, during the descent, may: control the SWARS lock onto the landing pad beacon; and perform the descent cross-check process to cross-check potential conflicts or to confirm the landing zone is clear. Using the descent cross-check process, the vehicle 101 may: control the AHRS to obtain positioning information and alignment information to confirm position and alignment to the landing pad beacon and control the SWARS to obtain altitude and descent rate to confirm altitude and descent rate (e.g., by performing the profile check process); control the camera to acquire the light pattern or identifier pattern (e.g., by performing the vision confirmation process); control the SWARS to scan and map the landing zone to ensure clearance (e.g., by performing the scanning confirmation process to ensure no other vehicles/obstacles are parked at/on the landing zone); and cross check conflicts (if any of the above indicates a potential conflict) or confirm landing pad is clear. The vehicle 101 may continue the descent cross-check process until the vehicle 101 lands on the landing zone.

For instance, in the above example, if the camera could not acquire the light pattern or identifier pattern, the descent cross-check process may determine a potential conflict, and cross-check the potential conflict by controlling the SWARS to scan and map the landing zone to confirm the potential conflict as an obstacle (or obtain the most recent output of the scanning confirmation process). If the potential conflict is confirmed as an obstacle, then the descent cross-check process may determine an unsafe condition and abort the descent to the landing zone.

In another aspect of the disclosure, the descent cross-check process may determine an unsafe condition (and therefore stop the descent to the landing zone), if the vehicle 101 receives an instruction message from the cloud service 205 that another vehicle or obstacle is present on the landing zone. The vehicle 101 may confirm this information by performing one or both of the scanning confirmation process and the vision confirmation process. The vehicle 101 may stop the descent (or not even start the descent) with or without confirming the information.

If no unsafe conditions are detected, the multi-sensor and navigation sensor suite of the vehicle may continue the descent cross-check process until the vehicle lands on the landing zone. Therefore, the multi-sensor and navigation sensor suite may confirm a landing is proceeding in a safe manner by cross-checking multiple different sensor systems (e.g., radar and cameras) and data sources (AHRS and GPS systems).

Figure 6:
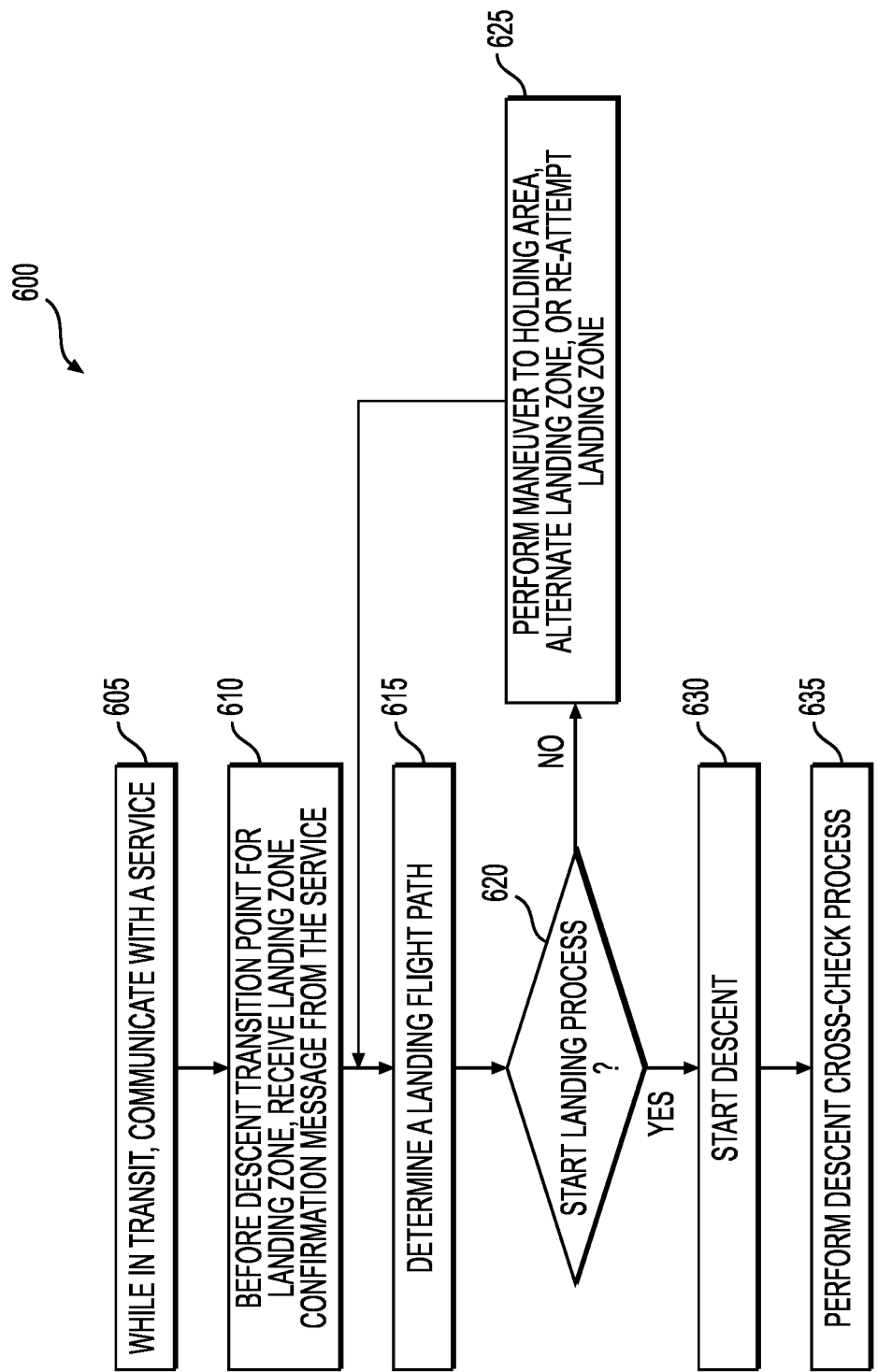
FIG. 6 depicts a flowchart for computing flight controls for vehicle landing using sensor data fusion, according to one or more embodiments.

FIG. 6 depicts a flowchart for computing flight controls for vehicle landing using sensor data fusion, according to one or more embodiments. The flowchart 600 may depict a landing process of a vehicle, such as for the aircraft 131. The flowchart 600 may be performed by the aircraft 131, either semi or fully autonomously.

The aircraft 131 may start the process of the flowchart 600 to, while in transit, communicate with a service (block 605). For instance, the aircraft 131 may transmit current positioning information to the cloud service 205 and receive initial landing zone confirmation messages and/or weather information, as discussed above with respect to FIGS. 3A and 3B.

The aircraft 131 may continue the process to, before a descent transition point for a landing zone, receive a landing zone confirmation message from the service (block 610). For example, the aircraft 131 may receive a final confirmation of a clear landing zone, as discussed above with respect to FIGS. 3A and 3B.

The aircraft 131 may continue the process to determine a landing flight path (block 615). For instance, the aircraft 131 may input a landing zone location (e.g., GPS position) into the flight routing program 344 to determine the landing flight path, as discussed above with respect to FIGS. 3A and 3B.

The aircraft 131 may continue the process to determine whether to start a landing process (block 620). For instance, the aircraft 131 may determine whether the aircraft 131 has reached the descent transition point 405 (e.g., by determining whether the GPS position of the aircraft 131 is within a threshold distance to a position of the descent transition point 405), as discussed above with respect to FIGS. 3A and 3B.

In response to determining not to start the landing process (block 620: No), the aircraft 131 may continue the process to perform a maneuver to a holding area, an alternate landing zone, or to re-attempt the landing zone (block 625). The aircraft 131 may continue the process to determine a landing flight path (block 615), e.g., to the same landing zone or different landing zone.

In response to determining to start the landing process (block 620: Yes), the aircraft 131 may continue the process to start the descent (block 630). The aircraft 131 may continue the process to perform a descent cross-check process (block 635). For instance, the aircraft 131 may control a multi-sensor and navigation sensor and perform the scanning confirmation process, the vision confirmation process, and/or the profile check process, as discussed above with respect to FIGS. 3A and 3B.

Figure 7:
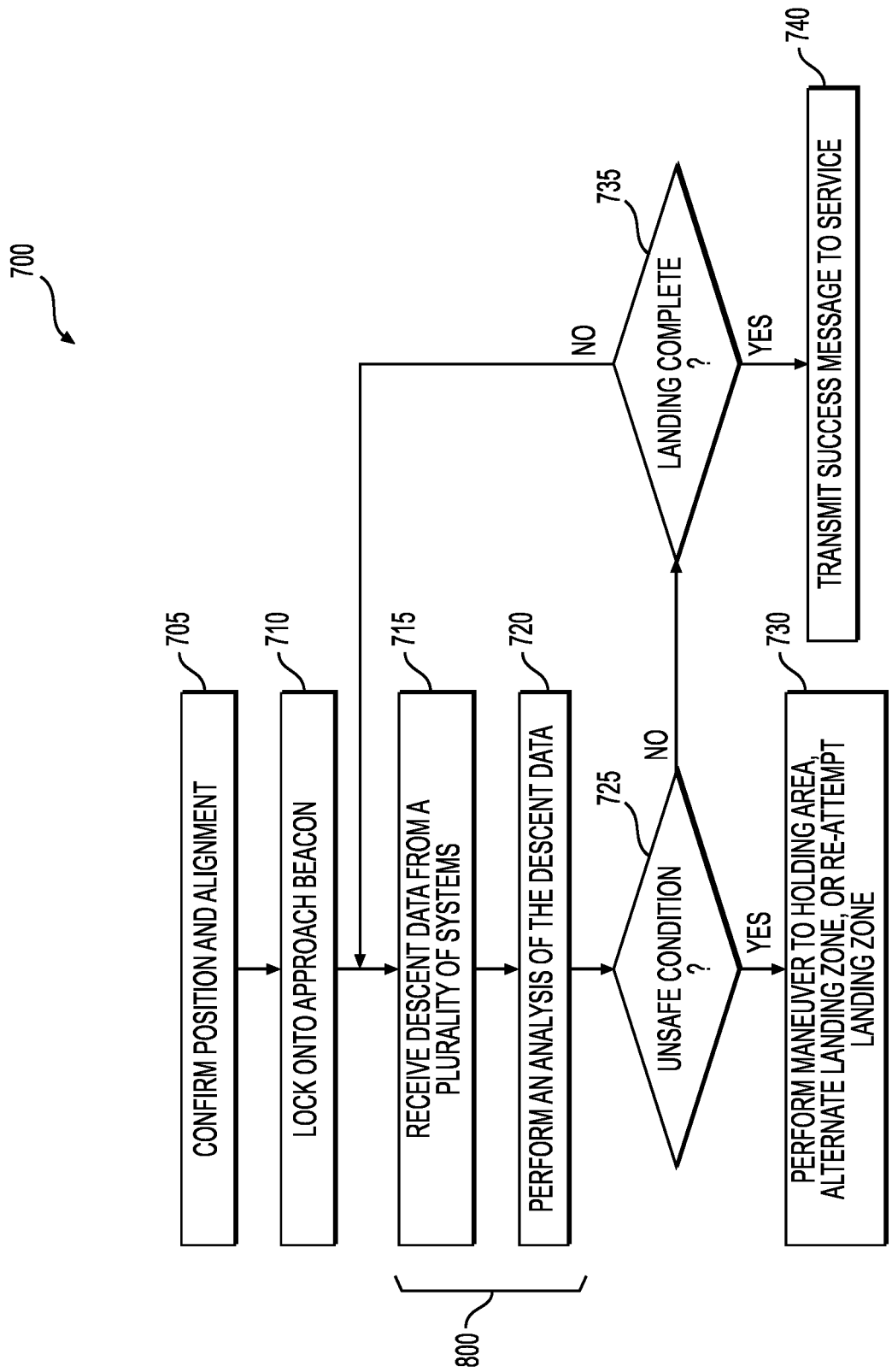
FIG. 7 depicts a flowchart for computing flight controls for vehicle landing using sensor data fusion, according to one or more embodiments.

FIG. 7 depicts a flowchart for computing flight controls for vehicle landing using sensor data fusion, according to one or more embodiments. The flowchart 700 may depict a descent cross-check landing process of a vehicle, such as for the aircraft 131, as discussed above in block 630 of FIG. 6. The flowchart 700 may be performed by the aircraft 131, either semi or fully autonomously.

The aircraft 131 may start the process of the flowchart 700 to confirm position and alignment (block 705). For instance, the aircraft 131 may perform the profile check process, as discussed above with respect to FIGS. 3A and 3B.

The aircraft 131 may continue the process to lock onto approach beacon (block 710). For instance, the aircraft 131 may control the radar system to lock on signals from the landing zone beacon, as discussed above with respect to FIGS. 3A and 3B.

The aircraft 131 may continue the process to receive descent data from one or more of a plurality of systems (block 715). For instance, the aircraft 131 may perform one or more of the scanning confirmation process, the vision confirmation process, and the profile check process to obtain the descent data, as discussed above with respect to FIGS. 3A and 3B.

The aircraft 131 may continue the process to perform an analysis of the descent data (block 720). For instance, the aircraft 131 may continue to perform one or more of the scanning confirmation process, the vision confirmation process, and the profile check process to determine a potential conflict or unsafe condition, as discussed above with respect to FIGS. 3A and 3B.

The aircraft 131 may continue the process to determine whether analysis result indicates an unsafe condition (block 725). For instance, the aircraft 131 may determine an unsafe condition if the descent cross-check process confirms a potential conflict as an obstacle or if the profile check process determines an unsafe condition, as discussed above with respect to FIGS. 3A and 3B.

In response to determining the analysis result indicates an unsafe condition (block 725: Yes), the aircraft 131 may continue the process to perform a maneuver to a holding area, an alternate landing zone, or to re-attempt the landing zone (block 730).

In response to determining the analysis result does not indicate an unsafe condition (block 725: No), the aircraft 131 may continue the process to determine whether the landing is complete (block 735). For instance, the aircraft 131 may determining whether the aircraft 131 has landed, such as be detecting wheel touch down.

In response to determining the landing is not complete (block 735: No), the aircraft 131 may continue the process to receive more descent data and perform the analysis again (blocks 715 and 720, respectively).

In response to determining the landing is complete (block 735: Yes), the aircraft 131 may continue the process to transmit a success message to the service (block 740). For instance, the aircraft 131 may transmit the success message to indicate the landing zone is in use by the aircraft 131.

Figure 8A:
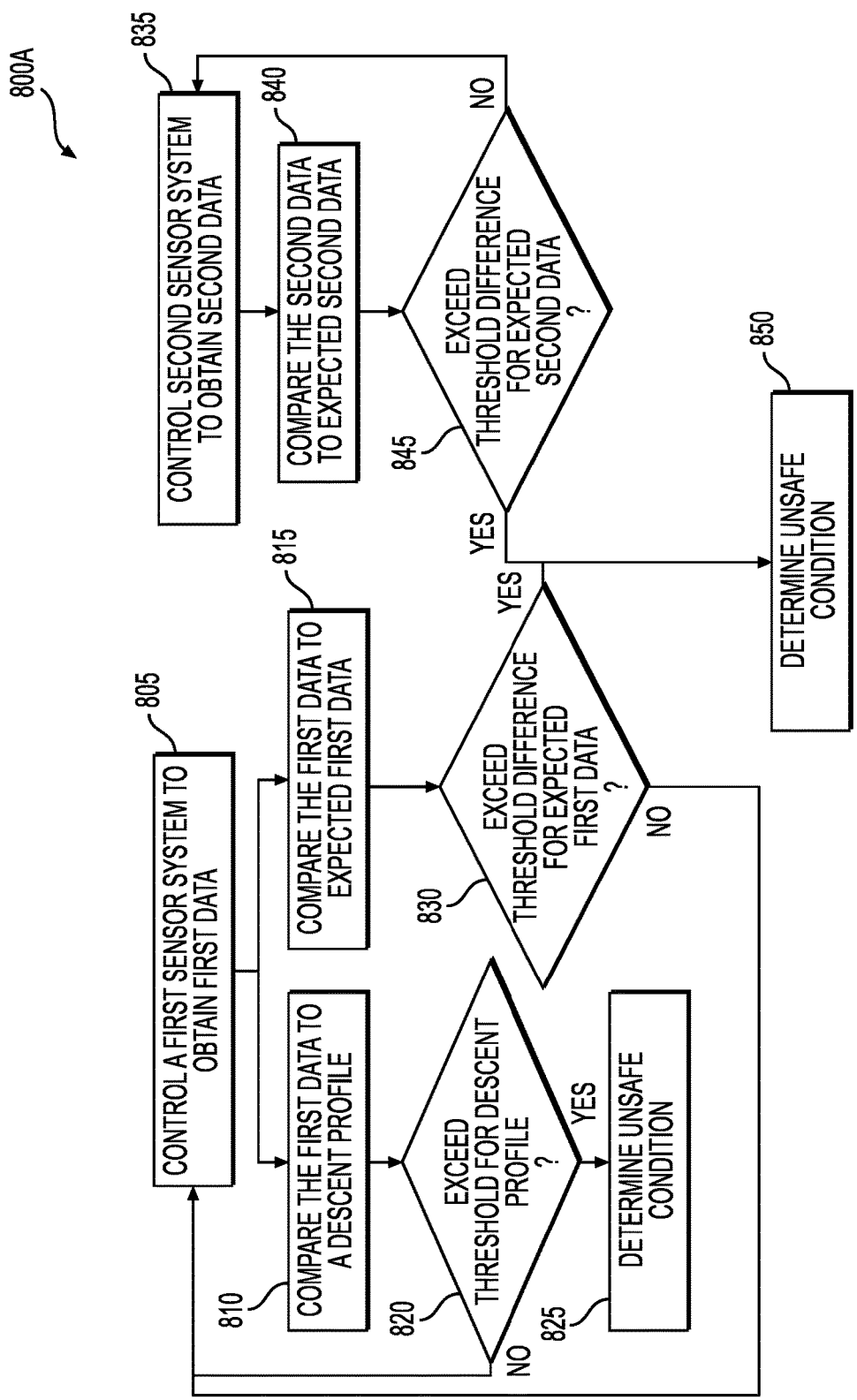
FIGS. 8A-8C depict flowcharts for computing flight controls for vehicle landing using sensor data fusion, according to one or more embodiments.
Figure 8B:
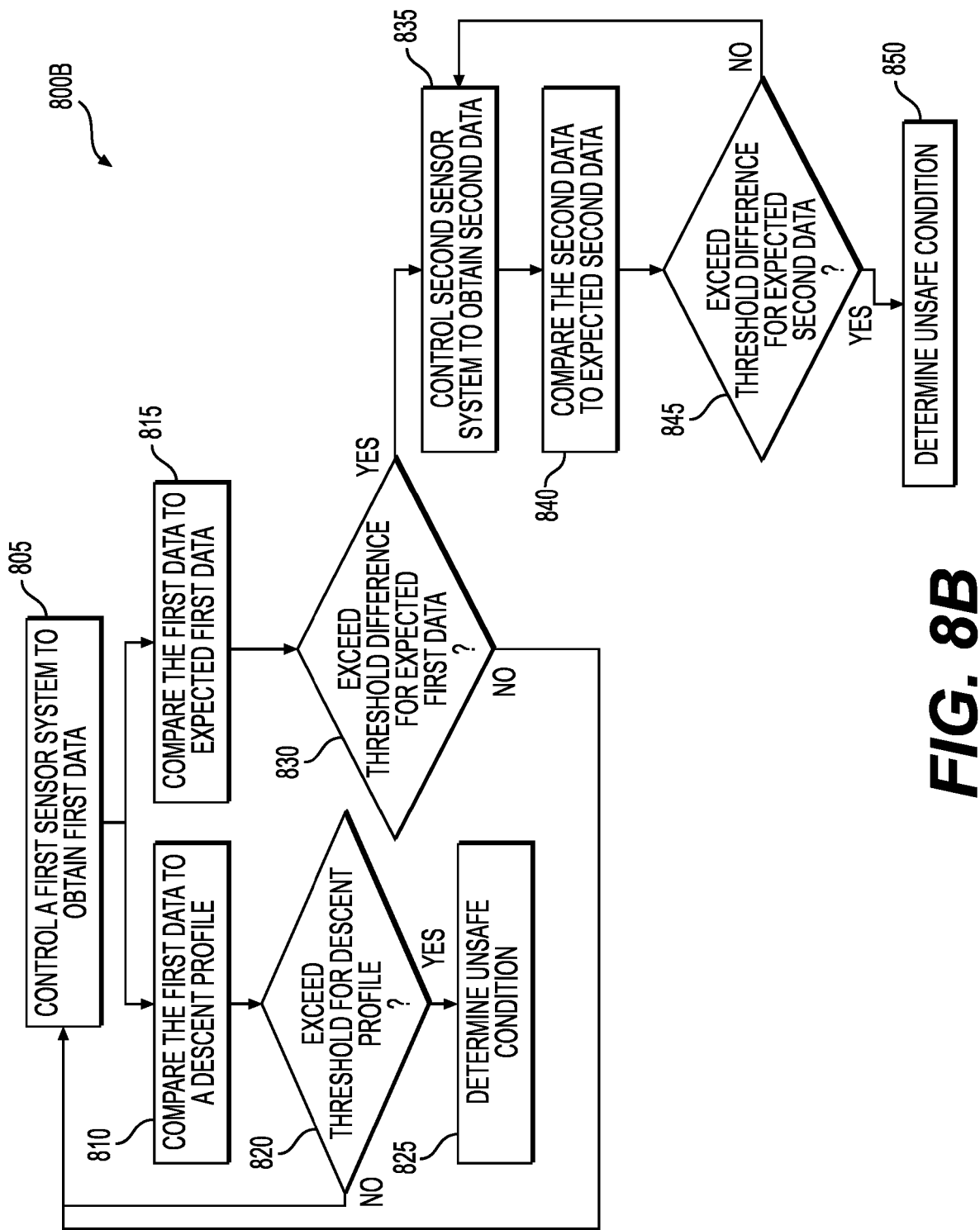
Figure 8C:
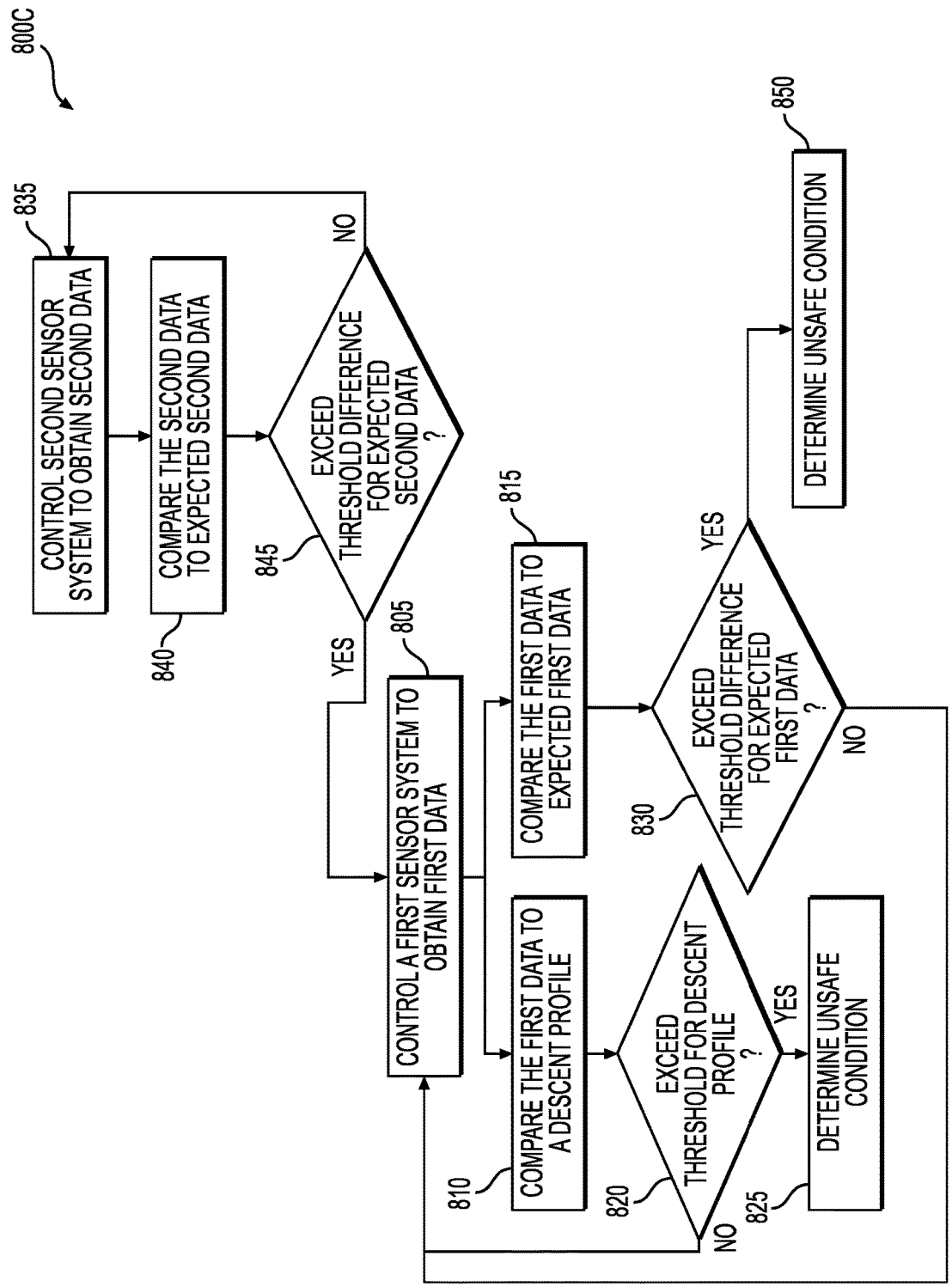

FIGS. 8A-8C depict flowcharts for computing flight controls for vehicle landing using sensor data fusion, according to one or more embodiments. The flowcharts 800A-800C may depict three different methods of receiving descent data and performing an analysis, as depicted in blocks 715 and 720 of FIG. 7. The flowcharts 800A-800C may be performed by the aircraft 131, either semi or fully autonomously.

The flowchart 800A may correspond to a separate process for the receiving descent data and performing an analysis; the flowchart 800B may correspond to a first sequential process for the receiving descent data and performing an analysis; the flowchart 800C may correspond to a second sequential process for the receiving descent data and performing an analysis. For instance, the separate process may independently control a first and second sensor system to detect an unsafe condition by executing a first sensor process and a second sensor process separately; the first sequential process may perform the first sensor process then, under certain circumstances, perform the second sensor process; the second sequential process may perform the second sensor process then, under certain circumstances, perform the first sensor process. The first sensor process may correspond to the blocks 805 through 830, and the second sensor process may correspond to the block 835 through 850.

The aircraft 131 may start the process of the flowchart 800A to control a first sensor system to obtain first data (block 805). For instance, the aircraft 131 may control a navigation system to obtain navigation information, a radar system to obtain radar data, and/or camera systems to obtain imaging output data, as discussed above with respect to FIGS. 3A and 3B.

The aircraft 131 may continue the process to (in parallel, at the same time, in sequence, alternatively, etc.) (1) compare the first data to a descent profile (block 810) and/or (2) compare the first data to expected first data (block 815). For instance, the aircraft 131 may (1) perform the profile check process to compare the first data to a descent profile and (2) perform the scanning confirmation process or the vision confirmation process to compare the first data to the expected first data, as discussed above with respect to FIGS. 3A and 3B.

In the case that the first data is compared to the descent profile, the aircraft 131 may continue the process to determine whether the comparison indicates the first data exceeds a threshold for the descent profile (block 820). For instance, the aircraft 131 may determine one or more conditions are not satisfied (e.g., aircraft 131 outside three-dimensional volume of the flight envelope condition), as discussed above with respect to FIGS. 3A and 3B. In response to determining the comparison does not indicate the first data exceeds the threshold for the descent profile (block 820: No), the aircraft 131 may continue the process to control the first sensor system to obtain more first data (block 805). In response to determining the comparison indicates the first data does exceed the threshold for the descent profile (block 820: Yes), the aircraft 131 may continue the process to determine an unsafe condition (block 825).

In the case that the first data is compared to the expected first data, the aircraft 131 may continue the process to determine whether the comparison indicates the first data exceeds a threshold for the expected first data (block 830). For instance, the aircraft 131 may determine a potential conflict if the scanning confirmation process or the vision confirmation process determines a substantial change, as discussed above with respect to FIGS. 3A and 3B. In response to determining the comparison indicates the first data does not exceed the threshold for the expected first data (block 830: No), the aircraft 131 may continue the process to control the first sensor system to obtain more first data (block 805). In response to determining the comparison indicates the first data exceeds the threshold for the expected first data (block 830: Yes), the aircraft 131 may continue the process to determine an unsafe condition (block 850). Separately, the aircraft 131 may also independently start the process of the flowchart 800A to control a second sensor system to obtain second data (block 835). For instance, the aircraft 131 may control the radar system to obtain the radar data or control the camera systems to obtain the imaging output data to obtain the second data, as discussed above with respect to FIGS. 3A and 3B.

The aircraft 131 may continue the process compare the second data to expected second data (block 840). For instance, the aircraft 131 may perform the other of the scanning confirmation process or the vision confirmation process, as discussed above with respect to FIGS. 3A and 3B.

The aircraft 131 may continue the process to determine whether the comparison indicates the second data exceeds a threshold for the expected second data (block 845). For instance, the aircraft 131 may determine a potential conflict if the scanning confirmation process or the vision confirmation process determines a substantial change, as discussed above with respect to FIGS. 3A and 3B. In response to determining the comparison indicates the second data does not exceed the threshold for the expected second data (block 845: No), the aircraft 131 may continue the process to control the second sensor system to obtain more second data (block 835). In response to determining the comparison indicates the second data exceeds the threshold for the expected second data (block 845: Yes), the aircraft 131 may continue the process to determine an unsafe condition (block 850).

The flowchart 800B may be same the same as the flowchart 800A, except the aircraft 131 may execute the first sensor process and, in response to determining the comparison indicates the first data exceeds the threshold for the expected first data (block 830: Yes), the aircraft 131 may continue the process to control the second sensor system to obtain second data (block 835), to therefore execute the second sensor process.

The flowchart 800C may be same the same as the flowchart 800A, except the aircraft 131 may execute the second sensor process and, in response to determining the comparison indicates the second data does exceed the threshold for the expected second data (block 845: Yes), the aircraft 131 may continue the process to control the first sensor system to obtain first data (block 805), to therefore execute the first sensor process.

Figure 9:
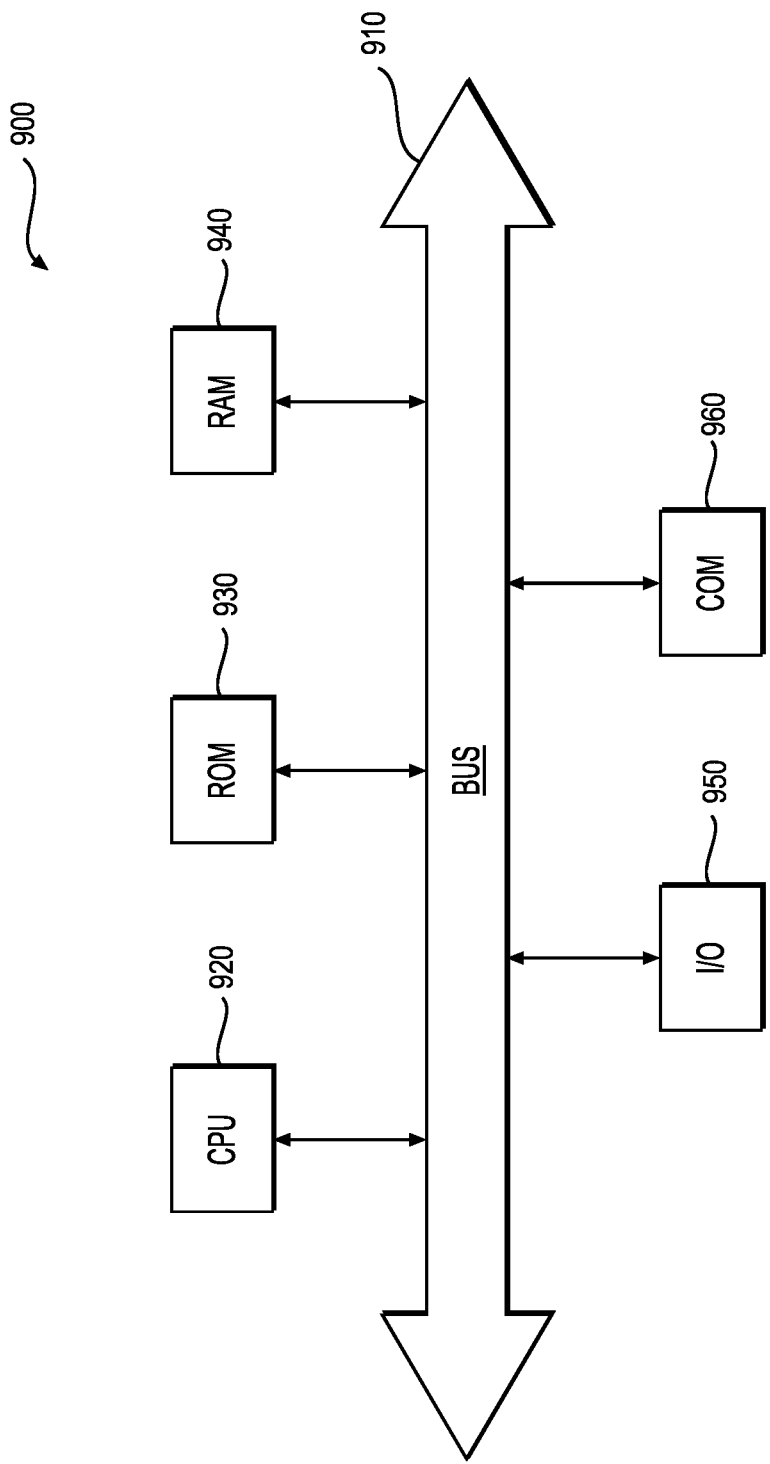
FIG. 9 depicts an example system that may execute techniques presented herein.

FIG. 9 depicts an example system that may execute techniques presented herein. FIG. 9 is a simplified functional block diagram of a computer that may be configured to execute techniques described herein, according to exemplary embodiments of the present disclosure. Specifically, the computer (or "platform" as it may not be a single physical computer infrastructure) may include a data communication interface 960 for packet data communication. The platform may also include a central processing unit ("CPU") 920, in the form of one or more processors, for executing program instructions. The platform may include an internal communication bus 910, and the platform may also include a program storage and/or a data storage for various data files to be processed and/or communicated by the platform such as ROM 930 and RAM 940, although the system 900 may receive programming and data via network communications. The system 900 also may include input and output ports 950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for computing flight controls for landing a vehicle, comprising:
   receiving an indication that a landing zone is clear;
   descending the vehicle based on a landing flight path for the landing zone;
   receiving landing zone data;
   performing, based on the landing zone data, a first sensor process including a profile check process and a first one of a scanning confirmation process or a vision confirmation process;
   performing, based on the landing zone data, in parallel or in sequence with the first sensor process, a second sensor process including a second one of the scanning confirmation process or the vision confirmation process;
   determining, based on the first sensor process and the second sensor process, whether an unsafe condition exists; and
   upon determining that an unsafe condition exists, computing flight controls for the vehicle to continue the descending of the vehicle or modify the descending of the vehicle.

2. The method of claim 1, further comprising:
   upon determining that an unsafe condition does not exist, continuing to descend the vehicle based on the landing flight path for the landing zone.

3. The method of claim 1, wherein computing the flight control for the vehicle to modify the descent includes modifying the descent by one or more of: decreasing descent rate, performing a maneuver to a holding area or alternative landing zone, or re-attempting the descent.

4. The method of claim 1, further comprising:
   receiving navigation data and radar data from the landing zone data;
   comparing the navigation data and data to a profile expected data set;
   based on the comparison, determine whether a substantial change is present;
   in response to determining that a substantial change is present, determining that the unsafe condition exists.

5. The method of claim 1, wherein the profile expected data set includes descent conditions including one or more of: a flight envelope condition, a descent rate condition; and/or heading, pitch, and/or roll conditions.

6. The method of claim 5, further comprising:
   determining whether the descent conditions are satisfied;
   in response to determining that the descent conditions are not satisfied, determining that an unsafe condition exist.

7. The method of claim 1, further comprising:
   receiving landing zone mapping data from a radar system scan;
   receiving expected landing zone mapping data including a two-dimensional area/three-dimensional structure of the landing zone when the landing zone is clear;
   comparing the landing zone mapping data to the expected landing zone mapping data;
   based on the comparison, determining whether a substantial change is present;
   in response to determining that a substantial change is present, determining a potential conflict or an unsafe condition.

8. A system for computing flight controls for landing a vehicle, the system comprising:
   a memory storing instructions; and
   a processor executing the instructions to perform a process including:
   receiving an indication that a landing zone is clear;
   descending the vehicle based on a landing flight path for the landing zone;

receiving landing zone data;
performing, based on the landing zone data, a first sensor process including a profile check process and a first one of a scanning confirmation process or a vision confirmation process;
performing, based on the landing zone data, in parallel or in sequence with the first sensor process, a second sensor process including a second one of the scanning confirmation process or the vision confirmation process;
determining, based on the first sensor process and the second sensor process, whether an unsafe condition exists; and
upon determining that an unsafe condition exists, computing flight controls for the vehicle to continue the descending of the vehicle or modify the descending of the vehicle.

9. The system of claim 8, the process further including: upon determining that an unsafe condition does not exist, continuing to descend the vehicle based on the landing flight path for the landing zone.

10. The system of claim 8, wherein computing the flight control for the vehicle to modify the descent includes modifying the descent by one or more of: decreasing descent rate, performing a maneuver to a holding area or alternative landing zone, or re-attempting the descent.

11. The system of claim 8, the process further including:
receiving navigation data and radar data from the landing zone data;
comparing the navigation data and data to a profile expected data set;
based on the comparison, determine whether a substantial change is present;
in response to determining that a substantial change is present, determining that the unsafe condition exists.

12. The system of claim 8, wherein the profile expected data set includes descent conditions including one or more of: a flight envelope condition, a descent rate condition; and/or heading, pitch, and/or roll conditions.

13. The system of claim 12, the process further including:
determining whether the descent conditions are satisfied;
in response to determining that the descent conditions are not satisfied, determining that an unsafe condition exist.

14. The system of claim 8, the process further including:
receiving landing zone mapping data from a radar system scan;
receiving expected landing zone mapping data including a two-dimensional area/three-dimensional structure of the landing zone when the landing zone is clear;
comparing the landing zone mapping data to the expected landing zone mapping data;
based on the comparison, determining whether a substantial change is present;
in response to determining that a substantial change is present, determining a potential conflict or an unsafe condition.

15. A non-transitory computer-readable medium storing instructions that, when executed by a processor, cause the processor to perform a method for computing flight controls for landing a vehicle, the method comprising:
receiving an indication that a landing zone is clear;
descending the vehicle based on a landing flight path for the landing zone;
receiving landing zone data;
performing, based on the landing zone data, a first sensor process including a profile check process and a first one of a scanning confirmation process or a vision confirmation process;
performing, based on the landing zone data, in parallel or in sequence with the first sensor process, a second sensor process including a second one of the scanning confirmation process or the vision confirmation process;
determining, based on the first sensor process and the second sensor process, whether an unsafe condition exists; and
upon determining that an unsafe condition exists, computing flight controls for the vehicle to continue the descending of the vehicle or modify the descending of the vehicle.

16. The non-transitory computer-readable medium of claim 15, the method further comprising:
upon determining that an unsafe condition does not exist, continuing to descend the vehicle based on the landing flight path for the landing zone.

17. The non-transitory computer-readable medium of claim 15, wherein computing the flight control for the vehicle to modify the descent includes modifying the descent by one or more of: decreasing descent rate, performing a maneuver to a holding area or alternative landing zone, or re-attempting the descent.

18. The non-transitory computer-readable medium of claim 15, the method further comprising:
receiving navigation data and radar data from the landing zone data;
comparing the navigation data and data to a profile expected data set;
based on the comparison, determine whether a substantial change is present;
in response to determining that a substantial change is present, determining that the unsafe condition exists.

19. The non-transitory computer-readable medium of claim 15, wherein the profile expected data set includes descent conditions including one or more of: a flight envelope condition, a descent rate condition; and/or heading, pitch, and/or roll conditions, the method further comprising:
determining whether the descent conditions are satisfied;
in response to determining that the descent conditions are not satisfied, determining that an unsafe condition exist.

20. The non-transitory computer-readable medium of claim 15, the method further comprising:
receiving landing zone mapping data from a radar system scan;
receiving expected landing zone mapping data including a two-dimensional area/three-dimensional structure of the landing zone when the landing zone is clear;
comparing the landing zone mapping data to the expected landing zone mapping data;
based on the comparison, determining whether a substantial change is present;
in response to determining that a substantial change is present, determining a potential conflict or an unsafe condition.

* * * * *